(12) United States Patent
Forgette et al.

(10) Patent No.: US 9,778,990 B2
(45) Date of Patent: Oct. 3, 2017

(54) METHODS AND SYSTEMS FOR CONCURRENTLY TAKING SNAPSHOTS OF A PLURALITY OF VIRTUAL MACHINES

(71) Applicant: HEWLETT PACKARD ENTERPRISE DEVELOPMENT LP, Houston, TX (US)

(72) Inventors: Eric Forgette, Clarence, NY (US); Juhsun Wang, Santa Clara, CA (US); Gaurav Ranganathan, San Jose, CA (US); Manu Mehrotra, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 363 days.

(21) Appl. No.: 14/509,885

(22) Filed: Oct. 8, 2014

(65) Prior Publication Data

US 2016/0103738 A1  Apr. 14, 2016

(51) Int. Cl.
*G06F 17/30* (2006.01)
*G06F 11/14* (2006.01)
*G06F 9/455* (2006.01)

(52) U.S. Cl.
CPC ...... *G06F 11/1446* (2013.01); *G06F 11/1438* (2013.01); *G06F 11/1484* (2013.01);
(Continued)

(58) Field of Classification Search
CPC ............. G06F 9/45558; G06F 2201/84; G06F 9/45533; G06F 2201/815; G06F 17/30008;
(Continued)

(56) References Cited

U.S. PATENT DOCUMENTS 7,769,722 B1  8/2010 Bergant et al.
8,091,087 B2  1/2012 Ali et al.
(Continued)

OTHER PUBLICATIONS

"About schedule options for creating recovery points", Symantec Corporation (updated Oct. 17, 2013), downloaded from: http://www.symantec.com/docs/HOWTO13633, 5 pgs.
(Continued)

*Primary Examiner* — Dangelino Gortayo
(74) *Attorney, Agent, or Firm* — Ascenda Law Group, PC

(57) ABSTRACT

Techniques are described herein which minimize the impact of virtual machine snapshots on the performance of virtual machines and hypervisors. In the context of a volume snapshot which may involve (i) taking virtual machine snapshots of all virtual machines associated with the volume, (ii) taking the volume snapshot, and (iii) removing all the virtual machine snapshots, multiple virtual machine snapshots may be created in parallel. In the process of creating virtual machine snapshots, a storage system may determine which snapshots to create in parallel. The storage system may also prioritize snapshots from certain hypervisors in order to avoid the problem of "starvation", in which busy hypervisors prevent less busy hypervisors from creating snapshots. The techniques described herein, while mainly described in the context of snapshot creation, are readily applied to snapshot removal.

20 Claims, 18 Drawing Sheets

(52) U.S. Cl.
CPC .. *G06F 17/30008* (2013.01); *G06F 17/30088* (2013.01); *G06F 9/45533* (2013.01); *G06F 9/45558* (2013.01); *G06F 17/30082* (2013.01); *G06F 17/30215* (2013.01); *G06F 17/30336* (2013.01); *G06F 17/30893* (2013.01)

(58) Field of Classification Search
CPC ......... G06F 17/30082; G06F 17/30215; G06F 17/30312; G06F 17/30336; G06F 17/30893
USPC ....... 707/639, 610, 640, 661, 679, 736, 758; 718/1, 102, 104, 105; 711/6, 162
See application file for complete search history.

(56) References Cited

U.S. PATENT DOCUMENTS

| | | | |
|---|---|---|---|
| 8,261,268 B1 | 9/2012 | Forgette | |
| 8,352,938 B2* | 1/2013 | Hunt | G06F 9/4856 718/1 |
| 8,489,699 B2* | 7/2013 | Goggin | G06F 9/4856 709/213 |
| 8,566,542 B1 | 10/2013 | Wang et al. | |
| 8,650,562 B2 | 2/2014 | Hou et al. | |
| 8,656,018 B1* | 2/2014 | Keagy | G06F 8/63 709/220 |
| 8,665,893 B2* | 3/2014 | Tsirkin | H04L 47/50 370/412 |
| 8,688,935 B1 | 4/2014 | Yochai et al. | |
| 8,725,973 B2* | 5/2014 | Prahlad | G06F 11/1453 711/162 |
| 8,745,237 B2* | 6/2014 | Tsirkin | G06F 9/45558 709/226 |
| 8,769,048 B2 | 7/2014 | Kottomtharayil | |
| 8,949,187 B1 | 2/2015 | Satish et al. | |
| 8,959,509 B1 | 2/2015 | Sobel et al. | |
| 9,092,376 B1 | 7/2015 | Chelur et al. | |
| 9,135,033 B1* | 9/2015 | Lee | G06F 9/455 |
| 9,417,912 B2* | 8/2016 | Suh | G06F 9/4887 |
| 2002/0038296 A1 | 3/2002 | Margolus et al. | |
| 2004/0068636 A1 | 4/2004 | Jacobson et al. | |
| 2007/0168404 A1 | 7/2007 | Nakamura et al. | |
| 2007/0244938 A1 | 10/2007 | Michael et al. | |
| 2007/0271560 A1 | 11/2007 | Wahlert et al. | |
| 2009/0177718 A1 | 7/2009 | Patterson et al. | |
| 2009/0300303 A1 | 12/2009 | Balasubramanian | |
| 2011/0047340 A1 | 2/2011 | Olson et al. | |
| 2011/0225582 A1 | 9/2011 | Iikura et al. | |
| 2012/0084501 A1 | 4/2012 | Watanabe et al. | |
| 2012/0131480 A1 | 5/2012 | Kalmbach et al. | |
| 2012/0323853 A1 | 12/2012 | Fries et al. | |
| 2013/0054911 A1 | 2/2013 | Keller et al. | |
| 2014/0026133 A1 | 1/2014 | Parker | |
| 2014/0052953 A1 | 2/2014 | Ben-Tsion et al. | |
| 2014/0189270 A1 | 7/2014 | Iwanicki et al. | |
| 2014/0196039 A1 | 7/2014 | Kottomtharayil et al. | |
| 2015/0052108 A1 | 2/2015 | Volk et al. | |
| 2015/0052528 A1 | 2/2015 | French et al. | |
| 2015/0066857 A1* | 3/2015 | Dayal | G06F 17/30088 707/639 |
| 2016/0203013 A1* | 7/2016 | Bayapuneni | G06F 9/45545 718/1 |

OTHER PUBLICATIONS

"Backup Schedule Options", Symantec Corporation (updated Jul. 31, 2011), downloaded Sep. 5, 2014 from: http://www.symantec.com/docs/HOWTO23716, 2 pgs.
"CommCell Scalability Guide", CommVault Systems, downloaded Sep. 5, 2014 from: http://documentation.commvault.com/hds/v10/article?p=features/scalability/commcell.htm, 12 pgs.
"Create a Scheduled Task in the vSphere Web Client", Vmware vSphere 5.1 Documentation Center, downloaded Sep. 5, 2014 from http://pubs.vmware.com/vsphere-51/topic/com.vmware.vsphere.vcenterhost.doc/GUID-03B90638-6C70-4379-8CAF-D66866D115F4.html, 5 pgs.
"EMC VNXe Data Protection", EMC White Paper (Jan. 2013), 28 pgs.
"FalconStor Snapshot Director for VMware vSphere: User Guide", FalconStar Software, accessed Sep. 5, 2014, Version 5.00, 57 pgs.
"Managing Schedules for Snapshots and Replicas", PS Series Group Administration, downloaded Sep. 5, 2014 from: http://psonlinehelp.equallogic.com/V3.3/managing_schedules_for_snapshots_and_replicas.htm, 6 pgs.
"Multi-Instance Snap Optimization" CommVault Systems, downloaded Sep. 5, 2014 from: http://documentation.commvault.com/hds/v10/article?p=products/oracle/snap/snap_optimization.htm, 31 pgs.
"Multiple Nimble Microsoft VSS snapshots?", NimbleConnect (Jul. 2014), downloaded Sep. 5, 2014 from: https://connect.nimblestorage.com/thread/1714, 4 pgs.
"Pillar Axiom Data Protection Manager: Application-Consistent Automated Clone Management", Oracle Data Sheet (2013), 2 pgs.
"Scheduling—Getting Started", CommVault Systems, downloaded Sep. 5, 2014 from: http://documentation.commvault.com/hds/v10/article?p=features/scheduling/getting_started.htm, 6 pgs.
"Scheduling snapshots for multiple SQL instances in a Windows cluster?" NetApp Community (Sep.-Oct. 2011), downloaded Sep. 5, 2014 from: https://communities.netapp.com/thread/17429, 5 pgs.
"Stagger Snapshot copy schedules to avoid transfer conflicts", NetApp (updated Feb. 11, 2009), downloaded Sep. 5, 2014 from: https://library.netapp.com/ecmdocs/ECMM1224454/html/rnote/rel_notes/concept/c_oc_rn_lim-dp-snapshot-stagger.html, 1 pg.
"VM Snapshots: What they are and how to use them", Aug. 4, 2011, 2 pages,
Barr, "Veeam Enables Dramatically Better RPOs with Backup from Storage Snapshots," Veeam News Room, dated May 20, 2013, 7 pages.
Daemonchild, "vSphere Snapshots (Part 1)," dated Dec. 15, 2010, 5 pages.
Dell Equallogic, "Auto-Snapshot Manager/Microsoft Edition for Hyper-V," Solution Brief, 2009, 2 pages.
Equallogic, "PS Series Storage Arrays," Group Administration PS Series Firmware Version 5.0 dated Jun. 2010, 256 pages.
Experts Exchange, LLC, "Best order in which I should commit ESX Snapshots," dated Feb. 19, 2009, 15 pages.
Gilman; et al., "How Dell EqualLogic Auto-Snapshot Manager / Vmware Edition Helps Protect Virtual Environments" Dell Power Solutions (Nov. 2008), pp. 42-45.
Hazelman, Doug, "Countdown to v7—Backup from Storage Snapshots," Veeam, dated Jun. 24, 2013, 8 pages.
Jokeru, "The 'high load vm/ esxi nfs backup error' story," Wiki'ed, dated Mar. 19, 2014, 5 pages.
Microsoft, "Hyper-V Virtual Machine Snapshots: FAQ," dated Mar. 11, 2009, 3 pages.
Padron; et al., "A Case Study for Successful Deployment : Tivoli Storage Manager for Virtual Environments Data Protection for Vmware", IBM (Jun. 30, 2014), V1.0, 28 pgs.
Redhat, "Using Virtual Machine Snapshots," Redhat Customer Portal, date of access Aug. 29, 2014, 3 pages.
Search VMWARE.com,"Deleting virtual machine snapshots without wasting disk space," Tech Target, dated Mar. 11, 2011, 5 pages.
Sina Esfandiarpoor; All Pahlavan; Maziar Goudarzi, "Virtual Machine Consolidation for Datacenter Energy Improvement," Sharif University of Technology, Feb. 9, 2013, 11 pages.
Techtarget, SearchStorage.com, "Storage Snapshot," dated Jul. 19, 2005, 1 page.
Timothy Dewin, "What is the buzz around Backup from Storage Snapshots anyway?" Timo's Techie Corner, dated May 21, 2014, 8 pages.
UP2V, "Know the performance impact of snapshots used for backup," dated May 9, 2011, 8 pages.
Veeam, "How to create backups from storage snapshots with Veeam," Veeam Backup & Replication v7, dated Jun. 2014, 6 pages.
Veeam, "Snapshot removal issues of a large VM," VMware vSphere Community Forums, dated Jan. 19, 2010, 6 pages.

(56) References Cited

OTHER PUBLICATIONS

Veeam. "Step 3. Define VM Processing Order: User Guide for Veeam Backup Enterprise Manager," Veeam Backup Enterprise Manager 7.0, dated Nov. 18, 2013, 2 pages.
VMware, "Best practices for virtual machine snapshots in the VMware environment," VMware Knowledge Base, dated Dec. 20, 2013, 3 pages.
VMware, "Understanding Snapshots," Managing Virtual Machines, date of access Aug. 29, 2014, 2 pages.
VMware, "Understanding virtual machine snapshots in VMware ESXi and ESX," VMware Knowledge Base, dated Aug. 11, 2014, 5 pages.
VMware, "VMware vSphere Snapshot Best Practices," Apr. 17, 2014, 7 pages.
Vnoob, "Configure VM Snapshots for Crash-Consistent Quiescing with PowerCLI," Professional VMware, dated Dec. 14, 2012, 6 pages.
Chelur, Raja Shekar; et al., "Methods and Systems for Ordering and Removing Virtual Machine Snapshots", U.S. Appl. No. 14/474,014, filed Aug. 29, 2014, 52 pgs.
Cloudstack, "13.5. Working with Snapshots," date of access Apr. 17, 2014, 3 pages.
Enterprise Support, "Throttling Replication Director Operations with NetBackup," Symantec Corporation, date of Apr. 17, 2014, 19 pages.
Eric Siebert and Jacob Gsoedi, "Mistakes Made When Backing Up VMs & How to Prevent Them," TechTarget, 13 pages.
Das, Amrita, "SnapManager 2.0 for Virtual Infrastructure Best Practices," NetApp, dated Jan. 2010, 37 pages.
Siebert, Eric, "Top Five Mistakes Made when Backing Up VMs and How to Prevent Them," TechTarget, dated Aug. 8, 2011, 4 pages.
Vmware, "vSphere Monitoring and Performance", vSphere 5.5._vCenter Server 5.5._ESXi 5.5, 176 pgs, waybackmachine archived: https://web.archive.org/web/20140123174827/http://pubs.vmware.com/vsphere-55/topic/com.vmware.ICbase/PDF/vsphere-esxi-vcenter-server-55-monitoring-performance-guide.pdf, Jan. 23, 2014.

* cited by examiner

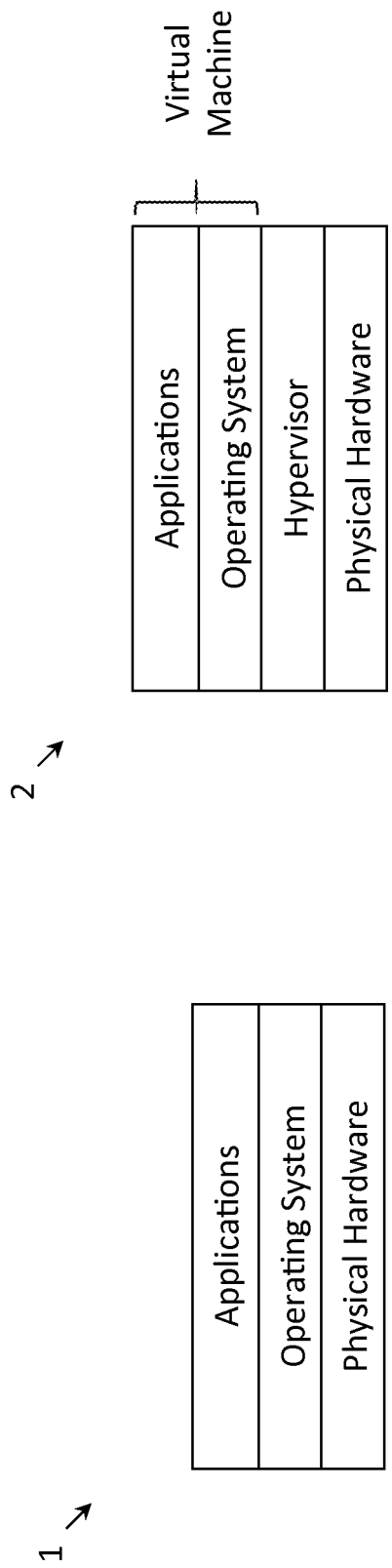

METHODS AND SYSTEMS FOR CONCURRENTLY TAKING SNAPSHOTS OF A PLURALITY OF VIRTUAL MACHINES

FIELD OF THE INVENTION

The present invention relates to methods and systems for concurrently taking snapshots of a plurality of virtual machines, and more specifically relates to concurrently taking snapshots of a plurality of virtual machines while taking into account the relationship between virtual machines and hypervisors.

BACKGROUND

To provide some background of a virtual machine, abstracted representations of several computing systems are first described. FIG. 1 depicts an abstracted representation of computing system 1 with a plurality of software applications (hereinafter, "applications"), a single operating system and physical hardware. Such components at times may be referred to as the different "layers" of the computing system (i.e., applications layer, operating system layer, physical hardware layer). The applications utilize the physical hardware (e.g., processors, memory, disk drives, network interface card, sound card, etc.) to help a user perform a specific task (e.g., word processing, surfing the web, etc.). The applications, however, typically do not interact directly with the physical hardware of computing system 1. Instead, the applications interact with the physical hardware through an operating system. For example, an application may send a request to the operating system to store data on a storage device of the physical hardware, and the operating system, in turn, may perform such request on behalf of the application. A single operating system typically hosts a plurality of applications, and accordingly, is tasked with managing how the applications share the resources of the physical hardware so that there are no contentions, data corruption, etc. On the other hand, the physical hardware of computer system 1 can typically only host a single operating system (or more precisely, only one operating system at any moment).

FIG. 2 depicts an abstracted representation of computing system 2 with an added layer between the operating system and the physical hardware. This layer is called the hypervisor (or also the virtual machine manager). In an analogous manner to how an operating system can manage how a plurality of applications share the resources of the physical hardware, the hypervisor can manage how a plurality of operating systems share the resources of the physical hardware. In computing system 2, the top two layers (i.e., applications and operating system) can be bundled together as a single unit, called a virtual machine.

Since the hypervisor allows a plurality of operating systems to execute at the same time, a plurality of virtual machines can also execute at the same time. Such an arrangement is depicted in computer system 3 of FIG. 3, in which the hypervisor hosts a plurality of virtual machines (VMs). Each virtual machine could be a virtual desktop, allowing a plurality of users to share the resources of the physical hardware. Alternatively, each virtual machine could be a web server and/or an application server, allowing a plurality of enterprises to share the resources of the physical hardware.

A virtual machine is typically characterized by the following information: virtual machine data, virtual machine configuration, and virtual machine operational state. Virtual machine data may refer to the contents of the virtual machine's hard disk (i.e., in-disk data). Such contents may include the virtual machine's operating system and application data. In some cases, a virtual machine's hard disk may correspond to a dedicated physical hard disk (i.e., physical hard disk that is dedicated to the virtual machine), while in other cases it may correspond to a collection of hard disks shared by a number of virtual machines. In the latter case, a virtual machine's hard disk may more specifically correspond to portions of one or more physical hard disks that are accessible to the virtual machine. In some cases, a virtual machine's hard disk is represented by one or more files (e.g., .vmdk files) that are stored in the collection of hard disks. Virtual machine data may additionally refer to the contents of the virtual machine's memory (i.e., in-memory data). Typically, a virtual machine's memory does not correspond to a dedicated memory card or memory chip (i.e., memory card or memory chip that is dedicated to the virtual machine). Rather, a pool of memory (e.g., formed by a plurality of memory cards and/or memory chips) is typically shared by a number of virtual machines, so a virtual machine's memory more accurately corresponds to portions of one or more memory cards and/or memory chips that are accessible to the virtual machine.

Virtual machine configuration may refer to the hardware resources required or requested by a virtual machine (e.g., the number of virtual central processing units (CPUs), an amount of random-access memory (RAM), the number of network interface cards (NICs), etc., and what type of each of the hardware components, if the hardware components come in different types). A virtual CPU refers to one or more CPUs of the physical hardware that may be shared by one or more virtual machines.

Virtual machine operational state may refer to the operational state of a virtual machine (e.g., whether the virtual machine is powered off, powered on, suspended, whether the contents of the virtual machine's memory have been written to a swap file, the number of virtual machine snapshots, the relationship between snapshots and the virtual machine's disks, etc.). Snapshots of a virtual machine are described below.

The state of a virtual machine typically refers to one or more of the virtual machine data, the virtual machine configuration, and virtual machine operational state at a particular point in time. In some cases, the state of a virtual machine refers to the virtual machine data, the virtual machine configuration, and virtual machine operational state (i.e., all three) at a particular point in time. It is noted that there is a potential for confusion in terminology as the "virtual machine operational state" is sometimes called "virtual machine state" by those in the field of the art, so it is necessary to rely on the context in which the term (i.e., virtual machine state) is used in order to determine whether virtual machine state refers to one or more of the virtual machine data, the virtual machine configuration, and virtual machine operational state at a particular point in time, or just the virtual machine operational state. To avoid such confusion, virtual machine state will hereinafter refer to one or more of the virtual machine data, the virtual machine configuration, and virtual machine operational state at a particular point in time. When referring specifically to the virtual machine operational state, the term "virtual machine operational state" will be used rather than the "virtual machine state".

An operation that can be performed to preserve the state of a virtual machine at a particular point in time is called snapshotting. The information representing the state of a virtual machine at a particular point in time, after a snapshotting operation, may be called a virtual machine snapshot (or just a snapshot in short, if the context is clear). After a snapshot is taken at a particular time, a user can revert to the state of the virtual machine at that particular time (i.e., return one or more of the virtual machine data, virtual machine operational state, and virtual machine configuration to the state they were in at the time the snapshot was taken).

There are two types of virtual machine snapshots from the application consistency point of view: crash-consistent snapshots and application-consistent snapshots. A crash-consistent snapshot only preserves the contents of a virtual machine's disk, whereas an application-consistent snapshot preserves the contents of the virtual machine's disk and memory. More precisely, data in the operating system's file system buffer (e.g., data that has been saved in the operating system's file system buffer but not yet saved on disk) may be saved in an application-consistent snapshot, but not saved in a crash-consistent snapshot. To elaborate, data may be saved in the operating system's file system buffer when an application (e.g., a word processing application) performs a save operation. On the other hand, unsaved application data (e.g., changes made to a Microsoft™ Word™ document that have not yet been saved) may not be captured by either a crash-consistent snapshot or an application-consistent snapshot.

In terms of performance, a crash-consistent snapshot has no impact (or very little impact) on the hypervisor or the virtual machine, when it is created and managed by the underlying disk storage (or disk storage system) without any interaction with the hypervisor. An application-consistent snapshot, on the other hand, does involve the hypervisor and the guest operation system (e.g., operating system that is part of the virtual machine). First, the hypervisor communicates with the guest operating system to "flush" the in-memory data of the virtual machine to disk (e.g., creates a file on the disk storage system that holds a point-in-time copy of the in-memory data of the virtual machine). Second, the hypervisor makes the file (or possibly, a plurality of files) that holds the in-disk data of the virtual machine read only and creates a separate file to store any new data or modifications to existing data. The former file (i.e., the file holding the in-disk data) is typically called the parent disk, and the latter file (i.e., the file storing new data or modifications to existing data) is often called the child disk (or delta disk). While crash-consistent snapshots have been described to offer a point of contrast to application-consistent snapshots, the remainder of the discussion will focus on application-consistent snapshots.

A virtual machine snapshot typically does not require the copying or duplication of any data (other than the point-in-time copy of the in-memory data of the virtual machine), but rather "freezes" the state of the virtual machine at a certain point in time by the creation of the read-only parent disk. If the user decides to restore the state of the virtual machine to that of the snapshot, the child disk is deleted and the virtual machine reverts to the state stored in the parent disk. Such operation is sometimes called "restoring" a snapshot. If the user decides that the snapshot is no longer needed (i.e., there is no longer a need to restore the virtual machine to the state when the snapshot was taken), the data of the child disk is incorporated (or merged) into the parent disk. Such operation is sometimes referred to as the "removal" or "deletion" of a snapshot.

While virtual machine snapshots are a useful administrative tool (e.g., allowing a user to restore a virtual machine to its state from an earlier point in time), virtual machine snapshots may negatively impact the performance of virtual machines and hypervisors. Such performance impact and techniques to address same are discussed herein.

SUMMARY OF THE INVENTION

In accordance with one embodiment, a process of taking snapshots of a group of virtual machines (whose state is at least partially stored in a volume of a storage system) comprises submitting snapshot requests to hypervisors (which manage the group of virtual machines) using multiple threads of execution on the storage system. More specifically, a storage controller of the storage system may create a plurality of queues, the plurality of queues having a one-to-one mapping to the plurality of hypervisors. Subsequently, the storage controller may place, for each of the virtual machines, a request to create a snapshot of the virtual machine in the queue mapped to the hypervisor which manages the virtual machine. The storage controller may create a plurality of threads, each of the threads being assigned a queue preference order.

While one or more requests remain in at least one of the queues, the storage controller may concurrently execute one or more of the threads over one or more time periods. During each of the one or more time periods, the execution of the one or more threads may cause the storage controller to perform the following for each of the one or more threads: (i) select one of the queues from those queues that still have at least one request, the selection based on the queue preference order assigned to the thread; (ii) retrieve one of the snapshot requests from the selected queue; and (iii) process the retrieved snapshot request. As a result of the processing of the one or more snapshot requests, a snapshot of one or more of the virtual machines is created so as to capture a state of one or more of the virtual machines.

In one embodiment, snapshot requests are not submitted from the storage system directly to hypervisors, but rather are submitted to a hypervisor manager, which then forwards the requests to the hypervisors.

In one embodiment, by assigning a queue for each of the hypervisors, the snapshot creation process is able to take the virtual machine to hypervisor relationship into consideration when performing virtual machine snapshots.

In one embodiment, by assigning a queue preference order to each of the threads, the phenomenon of "starvation" is avoided, in which busy hypervisors (i.e., hypervisors with a high resource utilization) prevent less busy hypervisors (i.e., hypervisors with a low resource utilization) from creating snapshots.

In one embodiment, a number of threads are assigned to a hypervisor, the number proportional to the number of requests that need to be processed by the hypervisor.

While such techniques are mainly described in the context of creating virtual machine snapshots, they may be readily applied in the context of removing virtual machine snapshots. These and other embodiments of the invention are more fully described in association with the drawings below.

BRIEF DESCRIPTION OF THE DRAWINGS

FIG. 1 depicts an abstracted representation of a computing system in which the operating system directly interfaces with the physical hardware of the computing system.

FIG. 2 depicts an abstracted representation of a computing system in which the operating system interfaces with the physical hardware via a hypervisor.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps is for one embodiment and it is understood that the order of steps may be different for other embodiments.

Figure 4:
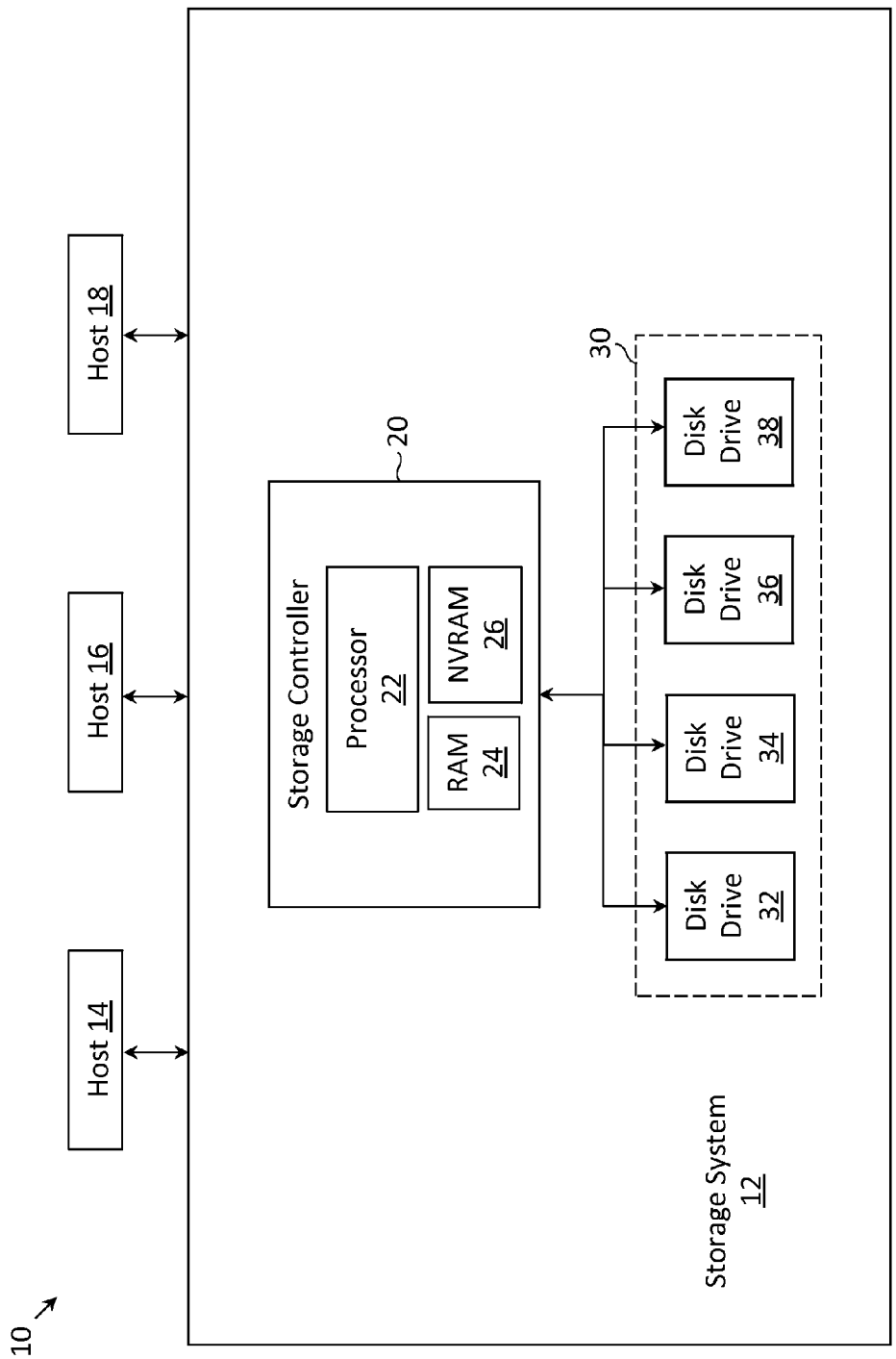
FIG. 4 depicts a storage system communicatively coupled to a plurality of hosts, in accordance with one embodiment.

FIG. 4 depicts system 10 in which storage system 12 may be communicatively coupled to a plurality of hosts (14, 16, 18), in accordance with one embodiment. Each of the hosts may transmit read and/or write requests to storage system 12, which in turn may process the read and/or write requests. While not depicted, storage system 12 may be communicatively coupled to each of the hosts via a network. The network may include a SAN, LAN, WAN, MAN, wired or wireless network, private or public network, a network using fibre channel, etc. While three hosts have been depicted in system 10, such number is exemplary, and a different number of hosts may be present in system 10.

Storage controller 20 of storage system 12 may receive the read and/or write requests and may process the read and/or write requests by, among other things, communicating with one or more of a plurality of storage units (32, 34, 36, 38). The plurality of storage units may be collectively referred to as storage array 30. While each of the storage units is depicted as a disk drive (typically understood as a magnetic disk-based storage device) in FIG. 4, the storage devices more generally may include one or more solid-state drives (e.g., flash drives), magnetic disk drives (e.g., hard disk drives), optical drives, etc. While four disk drives have been depicted in storage array 30, such number is exemplary, and a different number of disk drives may be employed in storage array 30.

Storage controller 20 may include processor 22, random access memory (RAM) 24 and non-volatile random access memory (NVRAM) 26. Processor 22 may direct the handling of read and/or write requests, and may oversee a volume snapshot (described below). RAM 24 may be used as a buffer (e.g., storing yet to be processed read and/or write requests) and/or may be used as a cache (e.g., storing data that has been retrieved from storage array 30 but not yet provided to one or more of hosts 14, 16 and 18). A portion of RAM 24 may be referred to herein as the main memory of storage system 12. NVRAM 26 may store data that must be maintained, despite a loss of power to storage system 12.

Figure 5A:
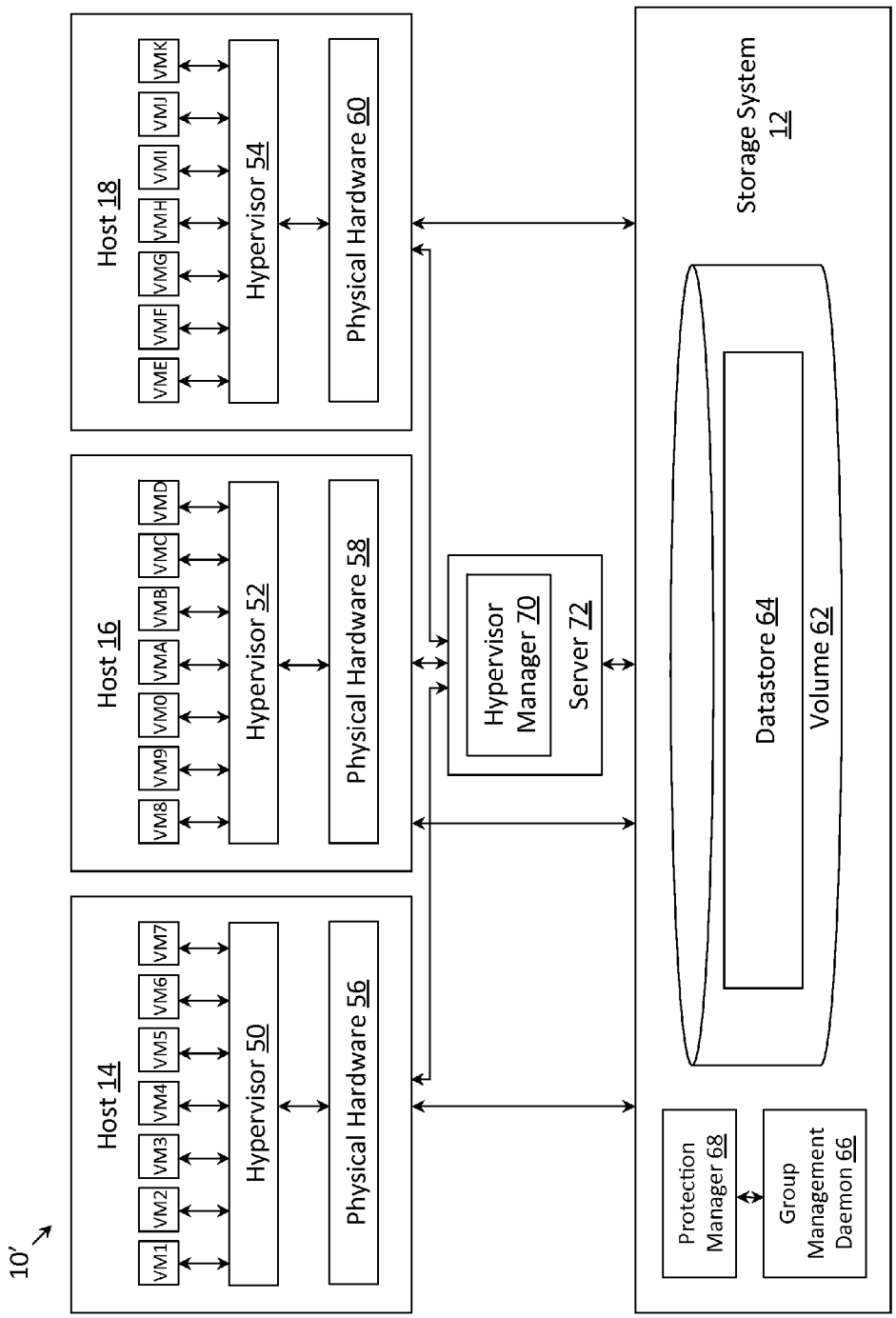
FIGS. 5A-5C depict a storage system communicatively coupled to a plurality of hosts within which a plurality of virtual machines are instantiated, in accordance with one embodiment.

FIG. 5A depicts system 10' (which is a variant of system 10), within which embodiments of the present invention may be instantiated. In system 10', storage system 12 is communicatively coupled to a specific embodiment of hosts (14, 16 and 18). Instantiated within host 14 is hypervisor 50, which may interface virtual machines VM1, VM2, VM3, VM4, VM5, VM6 and VM7 with physical hardware 56 of host 14. Instantiated within host 16 is hypervisor 52, which may interface virtual machines VM8, VM9, VM0, VMA, VMB, VMC and VMD with physical hardware 58 of host 16. Similarly, instantiated within host 18 is hypervisor 54, which may interface virtual machines VME, VMF, VMG, VMH, VMI, VMJ and VMK with physical hardware 60 of host 18. Examples of hypervisors are ESX™ (or an ESX host) from VMware, Inc.™ of Palo Alto, Calif.; a Xen™ hypervisor from Citrix Systems™ of Fort Lauderdale, Fla.; and a Hyper-V™ from Microsoft Corporation™ of Redmond, Wash. The number of virtual machines per hypervisor (7 in this description) is exemplary and any number of virtual machines per hypervisor may be present in practice.

Figure 3:
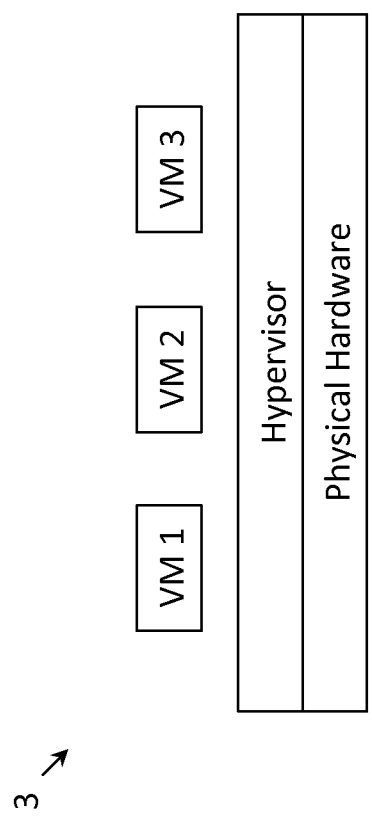
FIG. 3 depicts an abstracted representation of a computing system in which a hypervisor interfaces a plurality of virtual machines with the physical hardware of the computing system.

It is noted that host 14 may be one embodiment of computer system 3 depicted in FIG. 3. One feature of host 14 not described above in connection with FIG. 3 is that some of the virtual machine state (e.g., virtual machine data, virtual machine operational state, and virtual machine configuration) may not be stored locally on physical hardware 56 of host 14, but rather may be stored remotely in storage system 12 (i.e., remote from the perspective of host 14). With respect to the virtual machine data, the in-memory data of the virtual machines may be stored in the memory of physical hardware 56, while the in-disk data of the virtual machines may be stored in storage system 12. A similar description applies to hosts 16 and 18.

There may be a variety of reasons for using such remote storage to store the virtual machine state (i.e., storage that is shared being a plurality of hosts). Among one of the more compelling reasons is that, in such a configuration, any hypervisor can run a virtual machine. For example if host 18 crashes (stops processing), host 14 and host 16 can be used to start the virtual machines previously running on host 18. Such functionality may be part of reliability techniques known in the industry as "high availability". A second reason for shared storage is that it allows running virtual machines to be "migrated" between hypervisors, the term "migrate" meaning that a virtual machine executing on one host performs its next CPU instruction on a different host.

For ease of explanation, the internal components of storage system 12 have been redrawn in system 10' of FIG. 5A (as compared to its representation in FIG. 4). Depicted within storage system 12 is volume 62, which represents a storage area located on one or more of disk drives (28, 30, 32 and 34). If storage array 26 is implemented with RAID (redundant array of independent disks) techniques, volume 62 may be a logical partition of a RAID group of storage array 26.

Within volume 62 is datastore 64, which represents a portion of volume 62 that is made accessible (via a file system) to hypervisors 50, 52 and 54. Each of the hypervisors may store the on-disk data of its virtual machines on datastore 64. Typically, only one datastore is instantiated on a single volume (as depicted), but it is possible for a datastore to be distributed across multiple volumes (not depicted).

FIG. 5A also depicts protection manager 68 communicatively coupled to group management daemon 66, which may be both instantiated on storage system 12, or more specifically, instantiated on storage controller 20 of storage system 12. Hypervisor manager 70 (which may be instantiated on server 72 separate from the hosts and storage system) may interface protection manager 68 with hypervisors 50, 52 and 54. More specifically, hypervisor manager 70 may keep a record of the virtual machines instantiated on each of the hosts and a record of where the data of each virtual machine is stored (e.g., a virtual machine to datastore to storage system mapping). An example of a hypervisor manager is a vCenter Server™ from VMware.

As a brief overview of the communication between the components of FIG. 5A, when an administrator (not depicted) requests hypervisor manager 70 to activate a particular virtual machine on a particular hypervisor (for purposes of discussion, assume the virtual machine is VM1 and the hypervisor is hypervisor 50), hypervisor manager 70 may instruct hypervisor 50 to read the on-disk data of VM1 from datastore 64 of storage system 12 (e.g., information such as the operating system, and other data of the virtual machine). Hypervisor 50 may then read the on-disk data into its local random-access memory (RAM) (i.e., RAM on physical hardware 56) and start executing the virtual machine's operating system. All changes to the virtual machine's on-disk data (as the result of operation of the virtual machine) may be sent to storage system 12 with the assistance of hypervisor 50. The operation of group management daemon 66, protection manager 68 and hypervisor manager 70 will be described in more detail below in association with FIGS. 13A-13D.

Figure 5B:
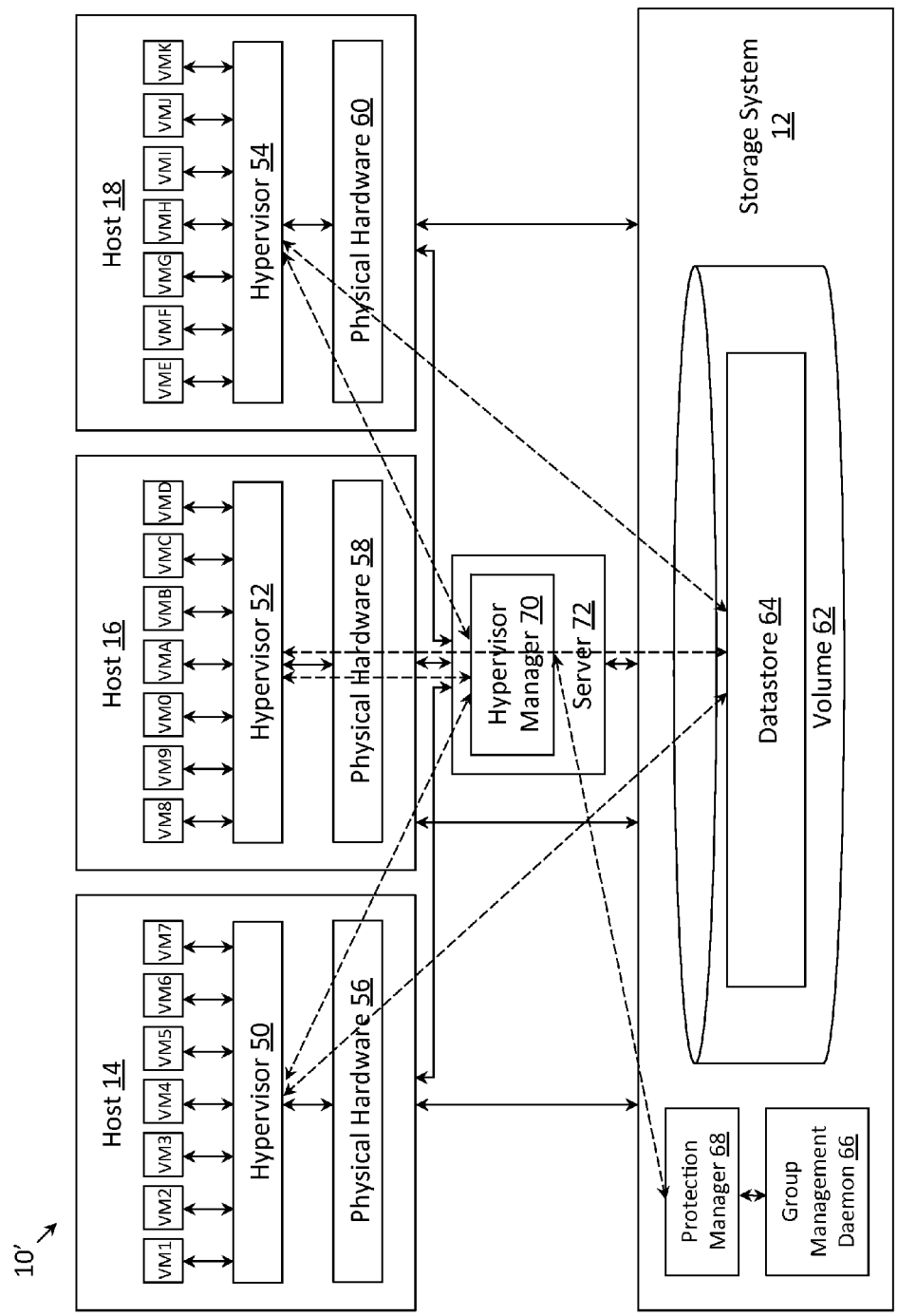

In FIG. 5B, implicit connections (e.g., data flow between two components which may pass through other components) of system 10' are annotated with dotted arrows. An implicit connection exists between hypervisor 50 and datastore 64, between hypervisor 52 and datastore 64, and between hypervisor 54 and datastore 64. Implicit connections also connect hypervisor manager 70 to each of protection manager 68, hypervisor 50, hypervisor 52 and hypervisor 54. Such implicit connections were previously described in association with FIG. 5A, and are now annotated in FIG. 5B to make these communication paths more apparent.

Figure 5C:
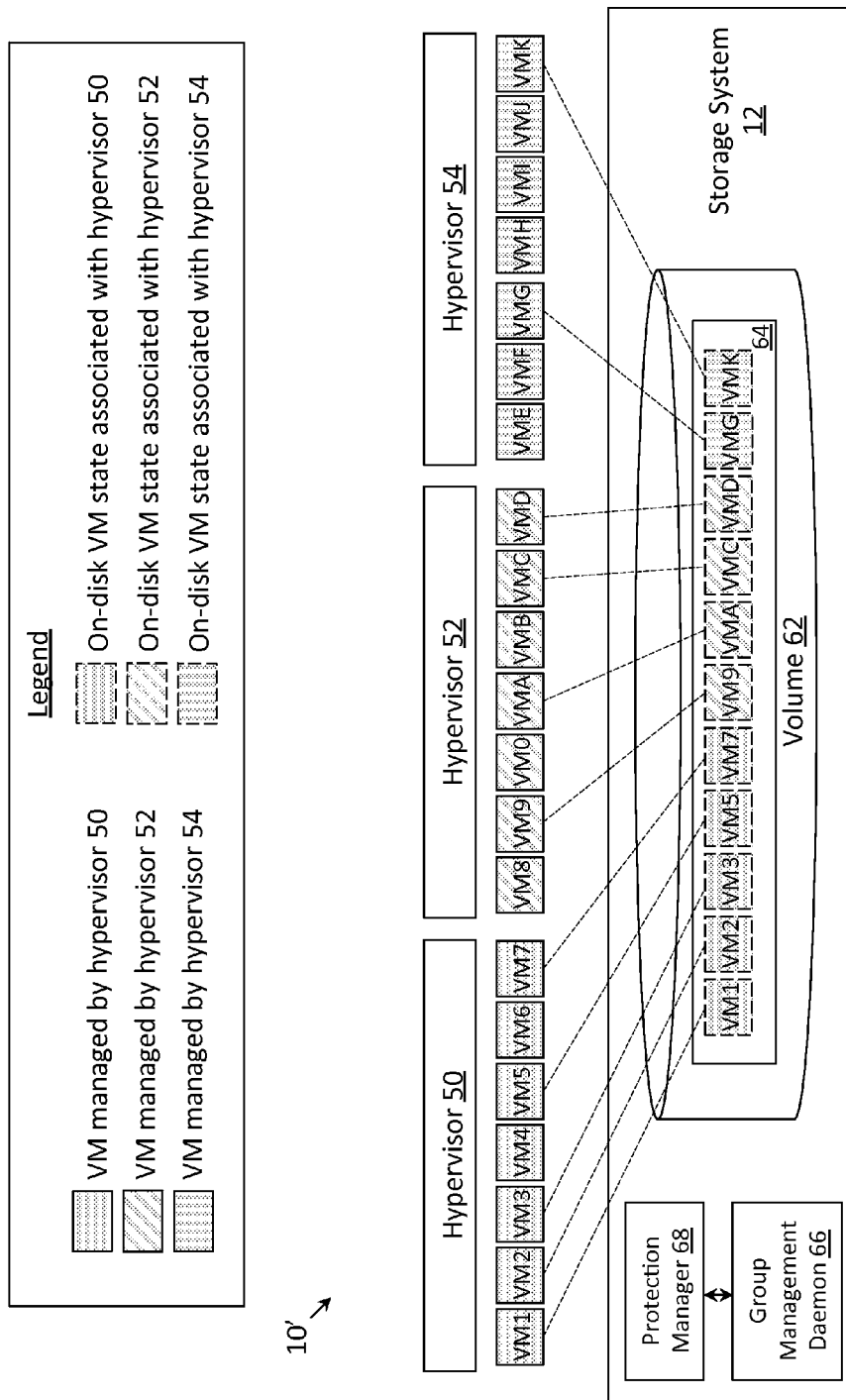

FIG. 5C is an abstracted version of FIG. 5B, which brings out the hypervisor to virtual machine relationships that are associated with the on-disk virtual machine states stored in datastore 64. As depicted in FIG. 5C, VM1, VM2, VM3, VM4, VM5, VM6 and VM7 are managed by hypervisor 50, and to illustrate this relationship, the aforementioned virtual machines are drawn under hypervisor 50. Of these virtual machines, the respective on-disk virtual machine states of VM1, VM2, VM3, VM5 and VM7 are stored on datastore 64. Dashed line connections help to associate each virtual machine with its on-disk state (i.e., the part of the virtual machine state that is stored on datastore 64). To help distinguish virtual machines from their respective on-disk states, virtual machines are drawn with solid borders, whereas their respective on-disk states are drawn using dashed borders. The absence of the respective on-disk states of VM4 and VM6 on datastore 64 indicates that the respective on-disk states of VM4 and VM6 are stored on a datastore other than datastore 64 (i.e., a datastore not depicted in FIG. 5C). A similar description applies for the virtual machines managed by hypervisors 52 and 54. For completeness, such description is provided in its entirety.

As further depicted in FIG. 5C, VM8, VM9, VM0, VMA, VMB, VMC and VMD are managed by hypervisor 52. Of these virtual machines, the respective on-disk states of VM9, VMA, VMC and VMD are stored on datastore 64. Dashed line connections help associate each virtual machine with its on-disk state. The absence of the respective on-disk virtual machine states of VM8, VM0 and VMB on datastore 64 indicates that the respective on-disk states of VM8, VM0 and VMB are stored on a datastore other than datastore 64 (i.e., a datastore not depicted in FIG. 5C).

As further depicted in FIG. 5C, VME, VMF, VMG, VMH, VMI, VMJ and VMK are managed by hypervisor 54. Of these virtual machines, the respective on-disk states of VMG and VMK are stored on datastore 64. The absence of the respective on-disk states of VME, VMF, VMH, VMI and VMJ on datastore 64 indicates that the respective on-disk states of VME, VMF, VMH, VMI and VMJ are stored on a datastore other than datastore 64 (i.e., a datastore not depicted in FIG. 5C).

It is noted that, on datastore 64, there is an uneven distribution of the number of on-disk virtual machine states associated with each of the hypervisors. Hypervisor 50 stores the on-disk state of five of its virtual machines on datastore 64, hypervisor 52 stores the on-disk state of four of its virtual machines on datastore 64, while hypervisor 54 stores the on-disk state of two of its virtual machines on datastore 64. Assuming that snapshots need to be taken for those virtual machines whose on-disk state is stored on datastore 64, hypervisor 50 would be requested to take snapshots of five virtual machines, hypervisor 52 would be requested to take snapshots of four virtual machines, while hypervisor 54 would be requested to take snapshots of two virtual machines. Techniques of some embodiments of the present invention (described below) address how to manage this unevenly distributed workload for the hypervisors. To make the uneven distribution more visually apparent, on-disk virtual machine states associated with hypervisor 50 are illustrated with horizontal hashing; on-disk virtual machine states associated with hypervisor 52 are illustrated with diagonal hashing; and on-disk virtual machine states associated with hypervisor 54 are illustrated with vertical hashing.

Figure 6:
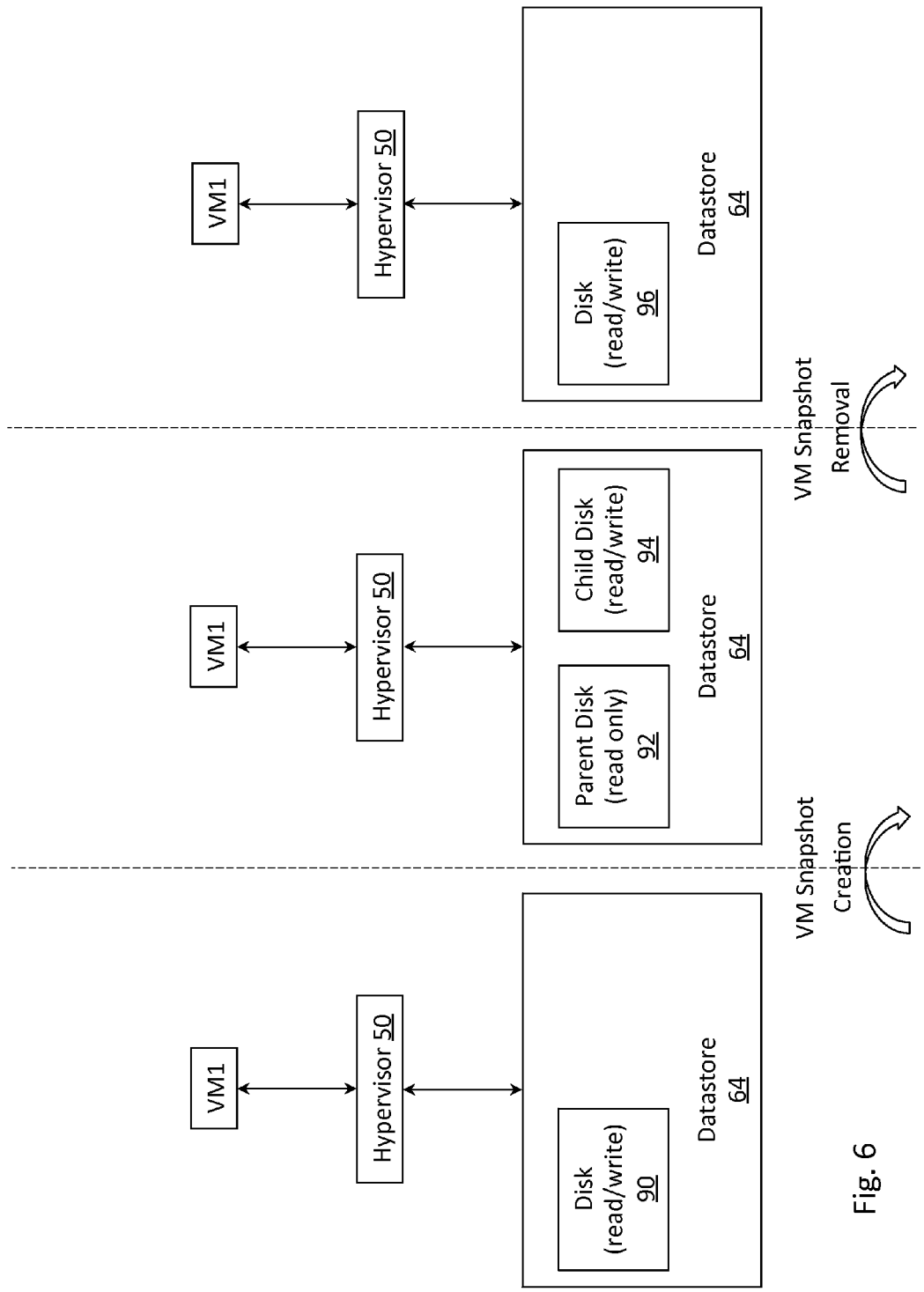
FIG. 6 depicts one or more disks associated with a virtual machine before and after a virtual machine snapshot creation operation, and before and after a virtual machine snapshot removal operation, in accordance with one embodiment.

To facilitate the discussion of virtual machine snapshots, FIG. 6 illustrates the process of creating (then removing) the snapshot of VM1 (VM1 being a randomly chosen one of the VMs for ease of explanation). In FIG. 6, a portion of the state of VM1 (i.e., the on-disk data of the virtual machine) is depicted before and after its snapshot is taken (i.e., before and after a VM snapshot creation operation). Prior to a VM snapshot creation operation, the on-disk data of VM1 is located on disk 90 (i.e., a file on datastore 64). With the assistance of hypervisor 50, VM1 may read data from and write data to disk 90. During a VM snapshot creation operation, a copy of the in-memory data of VM1 (stored on physical hardware 56) may be stored on datastore 64 of storage system 12 (not depicted). Such copying of data from host 14 to storage system 12 may degrade the performance of hypervisor 50 and VM1 and cause a spike in the resource utilization on hypervisor 50, as data needs to be transmitted from host 14 across a network to storage system 12. As part of the VM snapshot creation, disk 90 is marked as "read only" and becomes parent disk 92. Further, a child disk 94 (i.e., also a file on datastore 64) is created for storing any new data and modified data of VM1. Child disk 94 is read/write accessible. Following the virtual machine snapshot, the performance of VM1 and hypervisor 50 may be degraded during read operations. Instead of simply reading from disk 90 (i.e., which was possible prior to the virtual machine snapshot), hypervisor 50 will need to first read metadata from child disk 94 to determine whether any modifications to the data exist. If modifications exist, a read is performed on the child disk 94. If not, a read is performed on parent disk 92. For write operations, instead of simply writing to disk 90 (i.e., which was possible prior to the virtual machine snapshot), hypervisor 50 may need to first write metadata to child disk 94 to indicate that the write includes modifications to existing data. The actual data is then written to child disk 94. This results in a two-fold increase in the number of operations while the snapshot is in place. These problems are compounded as the number of snapshots of a particular virtual machine increases (i.e., as additional snapshots are created, the child disk 94 becomes the parent of the next child disk, and a chain or tree of child disks may be created).

FIG. 6 further depicts the state of VM1 (more precisely, its on-disk data) after its snapshot is removed (i.e., after a VM snapshot removal operation). The removal operation (i.e., performed by hypervisor 50) causes the data on child disk 94 to be merged onto parent disk 96, and causes the manner in which hypervisor 50 interfaces with datastore 64 to revert back to its original operation (i.e., the operation prior to the VM snapshot creation operation). The resulting disk is depicted as disk 96, which is read/write accessible just like disk 90. Such merging operation may degrade the performance of VM1 and hypervisor 50 (and/or cause a spike in the resource utilization of hypervisor 50), with the degree of the degradation proportional to the size of child disk 94. To elaborate, the more data that is on child disk 94, the more processing that will be involved (and the more time it will take) to transfer data on child disk 94 to parent disk 92. The degree of the degradation may also be related to how busy VM1 is. If VM1 is performing a lot of input/output operations while the hypervisor is trying to remove the snapshot, the VM snapshot removal process will take much longer (as compared to the circumstance in which VM1 is performing very few input/output operations). In some cases, the VM snapshot removal process may not complete if VM1 is very busy.

Another way to understand the performance impact of a virtual machine snapshot on data writes to datastore 64 (while the virtual machine snapshot exists) is to consider that every data write incurs an "extra" data read and write, as compared to a data write prior to a virtual machine snapshot. The extra data read occurs during the snapshot removal operation when data must be read from the child disk, and the extra data write occurs during the snapshot removal operation when data must be written from the child disk to the parent disk.

One way to address the performance impact of a virtual machine snapshot is to remove the snapshot as soon as it is not needed. This will minimize the time the hypervisor is required to read from both the parent and child disks, and will further minimize the time it takes for the hypervisor to remove the virtual machine snapshot (i.e., by minimizing the size of the child disk). While this strategy has merit, it is of no use if the virtual machine snapshot must be maintained for an extended period of time.

One may wonder whether it is possible to achieve the best of both worlds—to both maintain a virtual machine snapshot for an extended period of time and minimize the performance impact of the virtual machine snapshot. The use of a volume snapshot in conjunction with a virtual machine snapshot indeed makes it possible to satisfy both of these objectives. Before detailing how a volume snapshot is employed in conjunction with a virtual machine snapshot, some background information is provided regarding a volume snapshot.

As suggested by its respective names, a volume snapshot preserves the state of a volume (e.g., volume 62), whereas a virtual machine snapshot preserves the state of a virtual machine (e.g., virtual machine VM1). If, however, the state of a virtual machine is stored on a volume (e.g., parent and child disk of VM1 is stored on volume 62) and a snapshot of the volume is taken, whatever information that is stored on volume 62 will be preserved, in turn preserving the state of the virtual machine.

Conceptually, a volume snapshot is similar to a virtual machine snapshot in that they both allow one to revert to the state of a system or device at an earlier point in time. The technical manner in which a volume snapshot is captured, however, is different than the manner in which a virtual machine snapshot is captured. Whereas a virtual machine snapshot involves the creation of a parent and child disk (essentially freezing the state of the virtual machine on the parent disk), a volume snapshot operates on the pointers that organize the data on a volume. A volume snapshot essentially freezes the pointers and is a computationally efficient way to take and maintain a snapshot of a large quantity of data. The specific manner to implement a volume snapshot is known in the art and will not be described further herein.

Lastly, a volume snapshot is performed by storage controller 16 and does not require the involvement of any hypervisors in one embodiment. Therefore, while a volume snapshot may have a small impact on the performance of storage system 12 (and the performance of a volume in particular), a volume snapshot does not particularly impact the performance of virtual machines and/or hypervisors.

How a volume snapshot is used in conjunction with a virtual machine snapshot should now be more apparent. First, a virtual machine snapshot is taken. The virtual machine snapshot is immediately followed by a volume snapshot, which is then immediately followed by the removal of the virtual machine snapshot. This scheme, in fact, is able to achieve the best of both worlds. By removing the virtual machine snapshot (i.e., by incorporating the child disk into the parent disk) soon after it is created, the performance impact on the hypervisor and virtual machine is minimized. While the virtual machine snapshot is removed, the state of the virtual machine is still maintained by the volume snapshot.

In light of such benefits, it might seem logical to perform a volume snapshot after every virtual machine snapshot. This approach, however, is not practical as storage systems typically support a limited number of volume snapshots. Performing a volume snapshot after each virtual machine snapshot (and further retaining each volume snapshot after it is created) would cause the storage system to reach the volume snapshot limit very quickly.

Since a volume snapshot preserves the state of all the data on a volume, a compromise is to take snapshots of all virtual machines associated with a volume, then take a volume snapshot (i.e., preserving all the virtual machine snapshots with a single volume snapshot), and then remove all the virtual machine snapshots. Such an approach minimizes the number of volume snapshots (i.e., one volume snapshot for all virtual machine snapshots versus one volume snapshot for each virtual machine snapshot). The tradeoff is that virtual machine snapshots need to be maintained for a longer time. To elaborate, instead of taking a volume snapshot immediately after a single virtual machine snapshot has been created, the volume snapshot will occur only after all virtual machine snapshots have been created, increasing the amount of time that at least some of the virtual machine snapshots need to be maintained.

In the context of taking snapshots of all virtual machines associated with a volume, then taking a volume snapshot, and then removing all the virtual machine snapshots, the previously described goal of retaining virtual machine snapshots for as short a time as possible translates into the goal of taking snapshots of all virtual machines associated with a volume as quickly as possible and removing the snapshots of all virtual machines associated with the volume as quickly as possible. Much of the following description will focus on techniques for taking snapshots of all virtual machines associated with a volume as quickly as possible, with the understanding that such techniques can be similarly applied to the process of removing the snapshots of all virtual machines associated with the volume as quickly as possible.

One approach for taking snapshots of all virtual machines associated with a volume as quickly as possible is to use multiple threads of execution, or stated differently, execute multiple software threads (i.e., a software thread being a sequence of instructions) concurrently (hereinafter, "software thread" called "thread" for conciseness). The execution of multiple threads allows multiple virtual machine snapshots to be created in parallel. At this point, one may wonder whether there is any merit to taking virtual machine snapshots in parallel, as virtual machine snapshots cause a spike in resource utilization on the hypervisor (as mentioned above). One would assume that taking virtual machine snapshots in parallel would cause the resource utilization to spike even further. One strategy is to take virtual machine snapshots in parallel, but with the snapshots spread out over multiple hypervisors. As such, the spike in resource utilization will be spread out among the hypervisors, minimizing the impact to any one hypervisor. At this point, some examples may be helpful in illustrating the challenges and tradeoffs that may arise when taking virtual machine snapshots using multiple threads.

Figure 7:
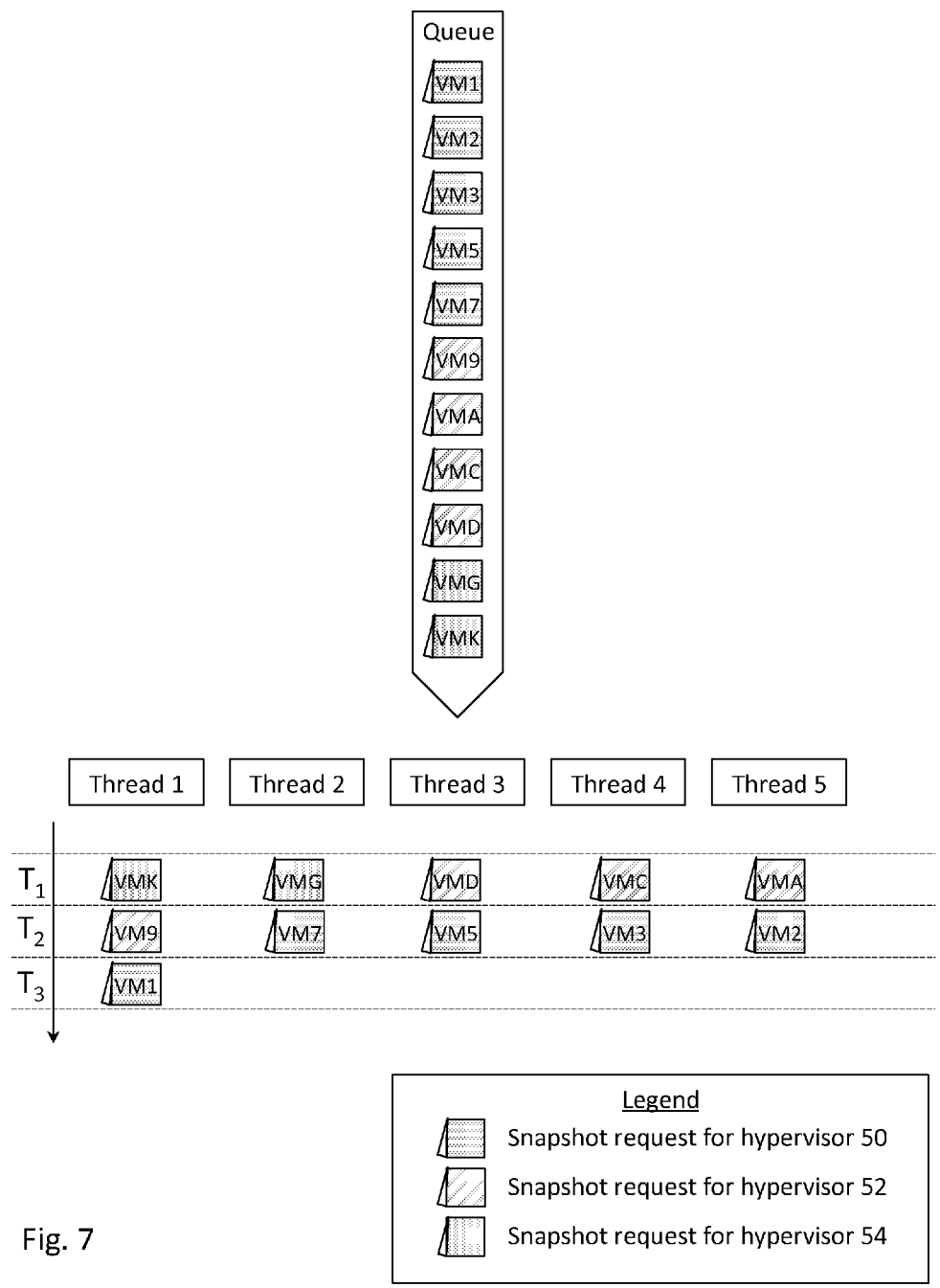
FIG. 7 depicts (i) a queue containing a plurality of snapshot requests (the requests being loaded into the queue for one hypervisor, then another hypervisor, and so on), (ii) a plurality of threads, and (iii) a sequence diagram displaying a plurality of time periods during which the execution of the threads causes the snapshot requests to be processed in parallel, in accordance with one embodiment.

FIG. 7 illustrates one possible setup for taking snapshots of the eleven virtual machines associated with datastore 64. Requests to take a snapshot of each of the eleven virtual machines are loaded into a queue (e.g., software queue) of protection manager 68. Five threads are concurrently executed by storage controller 20 (the threads more precisely belonging to protection manager 68). At each time period (also called time slices), the execution of the threads causes requests to be retrieved from the queue and processed (e.g., one request for each thread for each time period). In the example of FIG. 7, the execution of thread 1 causes the snapshot of VMK to be taken during time period $T_1$; causes the snapshot of VM9 to be taken during time period $T_2$; and causes the snapshot of VM1 to be taken during time period $T_3$. Similarly, the execution of thread 2 causes the snapshot of VMG to be taken during time period $T_1$ and the snapshot of VM7 to be taken during time period $T_2$. The execution of threads 3, 4 and 5 can be understood in a similar manner as threads 1 and 2. While five threads are present in the example, other number of threads may be possible. The number of threads, in fact, may be a user configurable parameter.

It is noted that the scenario of two threads retrieving the same request (i.e., collision in retrieval) should be avoided. One simple approach to avoiding such collision is to have the threads sequentially retrieve a request from the queue in the order of the thread number at the beginning of each time period. Such approach is followed in FIG. 7 (i.e., at the beginning of time period $T_1$, thread 1 retrieves the request to take the snapshot of VMK, then thread 2 retrieves the request to take the snapshot of VMG, then thread 3 retrieves the request to take the snapshot of VMD, and so on).

The processing of a request to take a snapshot of a subject virtual machine more particularly may involve protection manager 68 sending a request to hypervisor manager 70 to take a snapshot of the subject virtual machine. Hypervisor manager 70 in turn may send the request to the hypervisor which manages the subject virtual machine. The hypervisor then may create the snapshot of the subject virtual machine, in a manner similar to that described in conjunction with FIG. 6. As described above, the hypervisor may communicate with the guest operating system of the subject virtual machine to flush the in-memory data of the virtual machine to storage system 12. Further, the hypervisor may communicate with storage system 12 to "freeze" the contents of the virtual machine disk (i.e., thereby creating the parent disk) and create a new disk (i.e., child disk) to store any new data.

In the example of FIG. 7, during time period $T_1$, hypervisor 50 will receive no snapshot requests; hypervisor 52 will be requested to take a snapshot of VMD, VMC and VMA; and hypervisor 54 will be requested to take a snapshot of VMK and VMG. This uneven distribution of requests among the hypervisors is non-ideal, as hypervisor 52 will have extra load (i.e., be overwhelmed by requests from multiple threads), while hypervisor 50 which has the most snapshots to perform (i.e., 5) will not be requested to perform any snapshots. During time period $T_2$, hypervisor 50 will be requested to take a snapshot of VM7, VM5, VM3 and VM2; hypervisor 52 will be requested to take a snapshot of VM9; and hypervisor 54 will receive no snapshot requests. Such distribution of requests among the hypervisors is likewise non-ideal. While it might make sense for hypervisor 50 to perform the most snapshots (i.e., 4), since it has the most snapshots to perform (i.e., 5), it might not be ideal to request hypervisor 50 to perform all of these snapshots at the same time. Extra load will be placed on hypervisor 50 (which might degrade the performance of all virtual machines managed by hypervisor 50 and/or might increase the likelihood that hypervisor 50 will take multiple time periods to complete the snapshot requests).

A hypothetical example to compare the performance of concurrent versus serial snapshots (all by the same hypervisor) may be helpful. For instance, it might take four time periods for hypervisor 50 to serially take the snapshots of VM7, VMS, VM3 and VM2. It may take three time periods for hypervisor 50 to concurrently take the snapshot of VM7, VMS, VM3 and VM2 (i.e., if hypervisor 50 were requested to create these four snapshots at the same time). In contrast, it might take two time periods to create the same snapshots if hypervisor 50 were requested to take the snapshots two at a time (i.e., complete snapshots of VM7 and VM5 in time period $T_1$ and complete snapshots of VM3 and VM2 in time period $T_2$). In general, a "moderate" degree of concurrency is more ideal than no concurrency or a "large" degree of concurrency.

One way to improve the concurrent processing of snapshot requests is to optimize the order in which the snapshot requests are placed in the queue. In the example of FIG. 7, all the requests requiring processing by hypervisor 54 were placed in the queue (i.e., VMK and VMG), followed by the requests requiring processing by hypervisor 52 (i.e., VMD, VMC, VMA and VM9) and then followed by the requests requiring processing by hypervisor 50 (i.e., VM7, VM5, VM3, VM2 and VM1). It is noted that the requests were retrieved in the same order, making the queue of FIG. 7 a FIFO (First-In-First-Out) queue. While a FIFO queue has been described, it is possible for other types of queues may be utilized, whether LIFO (Last-In-First-Out), FILO (First-In-Last-Out), etc.

Figure 8:
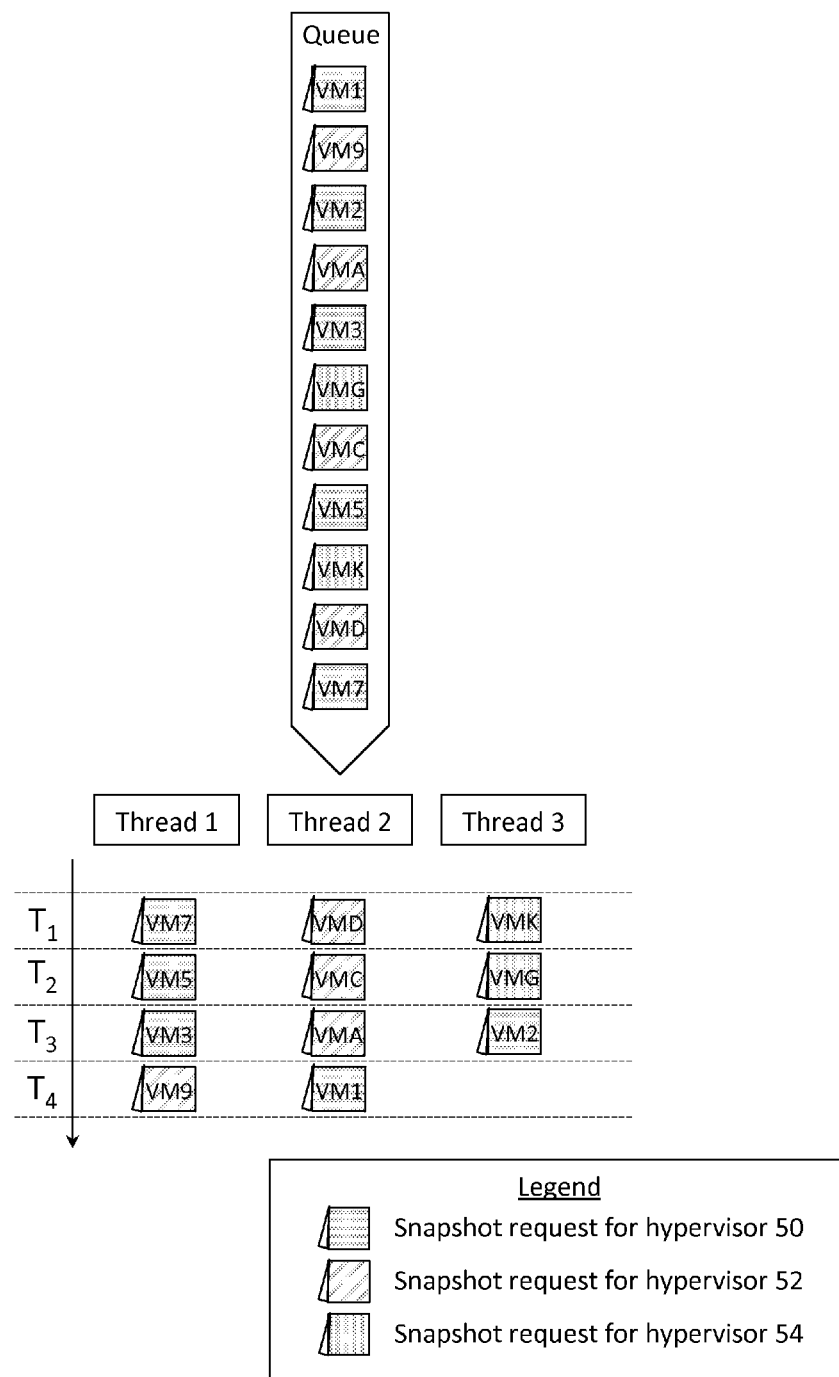
FIG. 8 depicts (i) a queue containing a plurality of snapshot requests (the requests being loaded into the queue in a round-robin manner), (ii) a plurality of threads, and (iii) a sequence diagram displaying a plurality of time periods during which the execution of the threads causes the snapshot requests to be processed in parallel, in accordance with one embodiment.

In the setup of FIG. 8, the requests are loaded into the queue in a "round robin" manner (i.e., load a single request requiring processing by hypervisor 50, load a single request requiring processing by hypervisor 52, load a single request requiring processing by hypervisor 54, and cycling through the hypervisors in a similar manner). More specifically, a request to take a snapshot of VM7 (i.e., a request for hypervisor 50), a request to take a snapshot of VMD (i.e., a request for hypervisor 52), a request to take a snapshot of VMK (i.e., a request for hypervisor 54), and so on are loaded into the queue. In contrast to the setup of FIG. 7, the setup of FIG. 8 only contains three threads (to bring out the concept of "starvation", described below). As a result of placing the requests into the queue in a round robin manner and using a number of threads equal to the number of hypervisors, each of the threads are (at least initially) associated with requests for a single hypervisor. Thread 1 is associated with requests for hypervisor 50; thread 2 is associated with requests for hypervisor 52; and thread 3 is associated with requests for hypervisor 54 (at least in the first two time periods). After there are no further requests for hypervisor 54 to process after time $T_2$, such association between threads and hypervisors is not maintained. It is noted that a round robin assignment of requests in the queue results in a fairly uniform distribution of requests to hypervisors in each time period, which is more ideal than the scheme described in FIG. 7.

Figure 9:
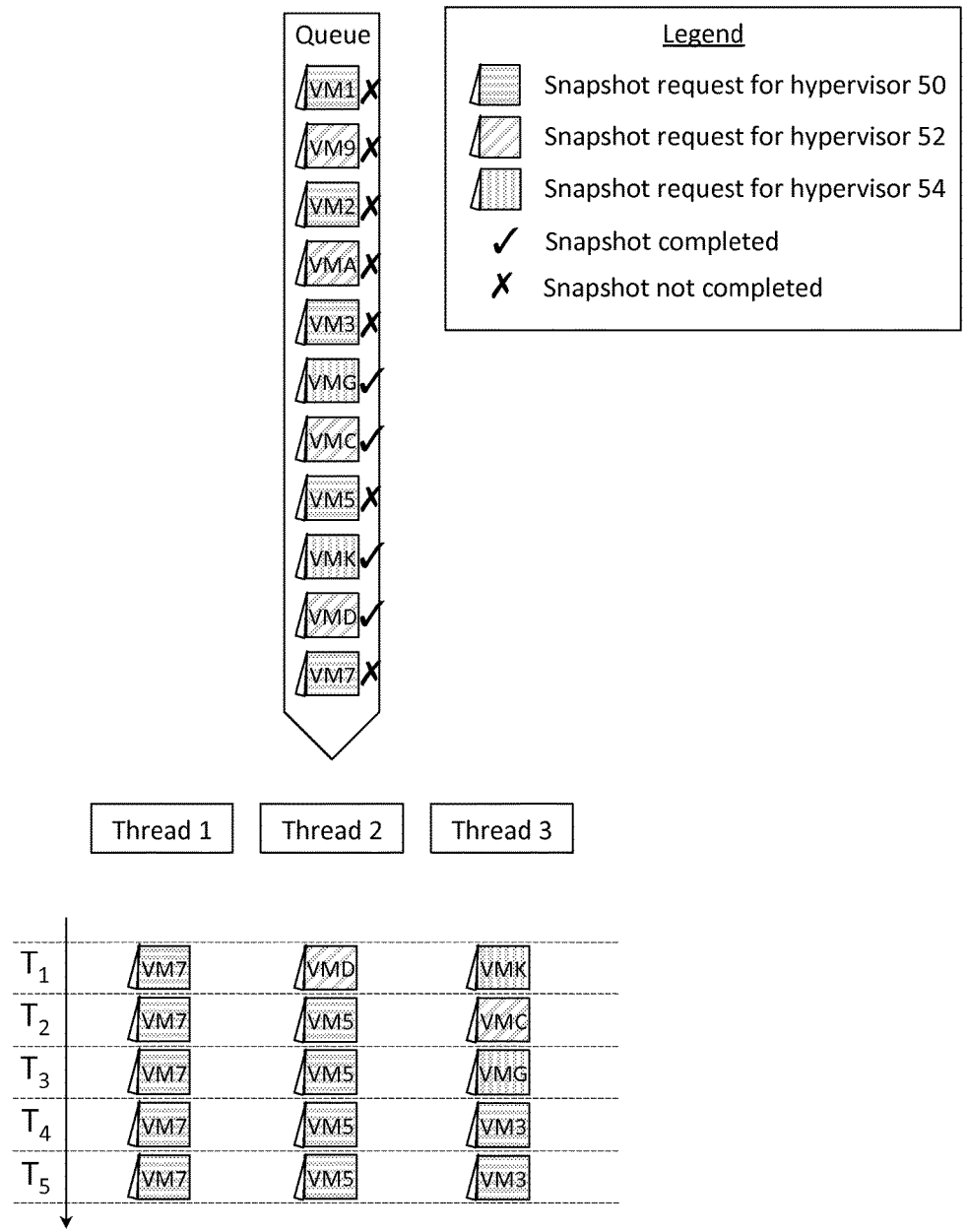
FIG. 9 depicts (i) a queue containing a plurality of snapshot requests (the requests being loaded into the queue in a round-robin manner), (ii) a plurality of threads, and (iii) a sequence diagram displaying a plurality of time periods during which the execution of the threads causes the snapshot requests to be processed in parallel, the sequence diagram exhibiting the phenomenon of "starvation" (described below), in accordance with one embodiment.

A round robin scheme, however, does not overcome the problem of "starvation" (e.g., a hypervisor is available to take a snapshot of a virtual machine, but no snapshot request is sent to the hypervisor). The setup of FIG. 8 is presented a second time in FIG. 9, but with the added phenomenon of starvation. In FIG. 9, hypervisor 50 receives snapshot requests, but is unable to complete the snapshot requests (e.g., due to excess load on hypervisor, low data rate between host 14 and storage system 12, etc.). As a result, execution of thread 1 causes the request to take a snapshot of VM7 to be retrieved in time period $T_1$, but the processing of such request by hypervisor 50 continues in the other time periods, preventing thread 1 from retrieving any further requests. (It is noted that the repetition of the "VM7" icon in time periods $T_1$ through $T_5$ does not mean that the request to take a snapshot of VM7 is retrieved in each of the time periods $T_1$ through $T_5$, but rather that the request is retrieved once in time period $T_1$, and the processing of that request continues from time period $T_1$ through to time period $T_5$.) Similarly, execution of thread 2 causes the request to take a snapshot of VM5 to be retrieved in time period $T_2$, but the processing of such request by hypervisor 50 continues in the subsequent time periods, preventing thread 2 from retrieving any further requests. Similarly, execution of thread 3 causes the request to take a snapshot of VM3 to be retrieved in time period $T_4$, but the processing of such request by hypervisor 50 continues in the subsequent time periods, preventing thread 3 from retrieving any further requests. Starvation causes no snapshots to be taken of VMA and VM9 (which are not managed by hypervisor 50) in a reasonable amount of time (or ever if a timeout occurs). Stated differently, VMA and VM9 could have been snapshotted by hypervisor 52, but due to all three threads being occupied with requests for hypervisor 50, no snapshot request (for VMA and VM9) was sent to hypervisor 52.

Figure 10:
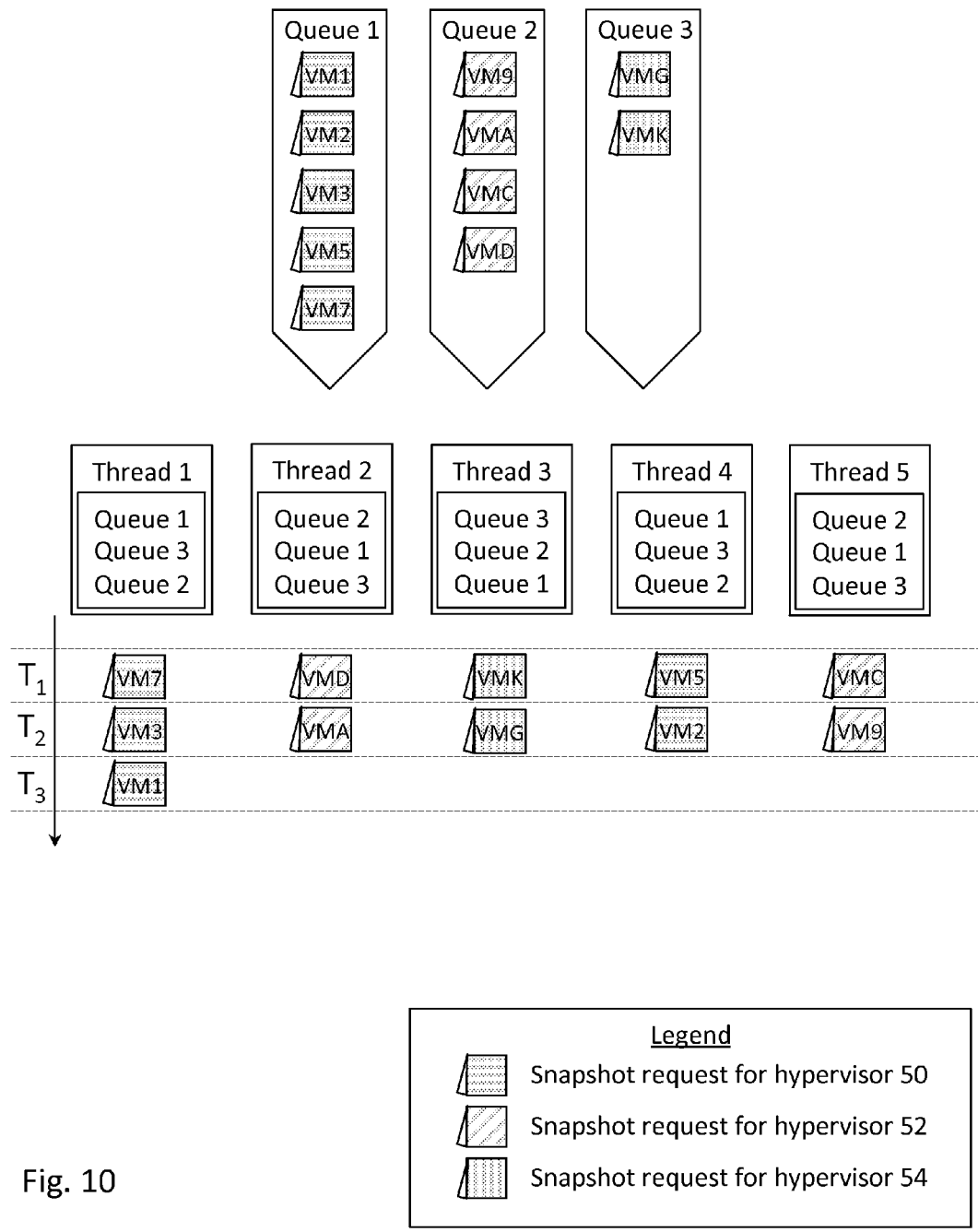
FIG. 10 depicts (i) a plurality of queues, each of the queues containing a plurality of snapshot requests to be handled by a respective one of the hypervisors, (ii) a plurality of threads, each of the threads associated with a queue preference order, and (iii) a sequence diagram displaying a plurality of time periods during which the execution of the threads causes the snapshot requests to be processed in parallel, in accordance with one embodiment.

To address the problem of starvation, the virtual machine to hypervisor relationship is taken into consideration in the setup of FIG. 10. Rather than using a single queue for all of the hypervisors, which loses the virtual machine to hypervisor relationship, a queue is created for each hypervisor (i.e., a one-to-one mapping between hypervisors and queues). Requests to be processed by hypervisor 50 (i.e., requests to take a snapshot of VM1, VM2, VM3, VM5, and VM7) are placed in the queue mapped to hypervisor 50 (i.e., queue 1); requests to be processed by hypervisor 52 (i.e., requests to take a snapshot of VM9, VMA, VMC, and VMD) are placed in the queue mapped to hypervisor 52 (i.e., queue 2); and requests to be processed by hypervisor 54 (i.e., requests to take a snapshot of VMG and VMK) are placed in the queue mapped to hypervisor 54 (i.e., queue 3). In one embodiment, the queue with the most number of requests is labeled as queue 1, the queue with the second most number of requests is labeled as queue 2, and so on. If two queues have an equal number of requests, either one of those queues can be labeled as queue i and the other queue can be labeled as queue i+1, in which i is the next queue number to be assigned.

In the example of FIG. 10, each thread is assigned a queue preference order. In accordance with the queue preference order, a thread is to first retrieve requests from the most preferred queue (if any) until no more requests remain in the most preferred queue, then retrieve requests from the second most preferred queue (if any) until no more requests remain in the second most preferred queue, and so on. In FIG. 10, the queue preference order for thread 1 is queue 1 (i.e., most preferred queue), followed by queue 3 (i.e., second most preferred queue), followed by queue 2 (i.e., least preferred queue). The preference order for thread 2 is queue 2 (i.e., most preferred queue), followed by queue 1 (i.e., second most preferred queue), followed by queue 3 (i.e., least preferred queue).

The method of determining the queue preference order for each of the threads is best understood by way of an example. In the following example, the number of threads is 5 and the number of queues is 3, just as in the example of FIG. 10:

1. The most preferred queue of thread 1 is assigned to queue 1.
2. The most preferred queue of thread 2 is assigned to queue 2.
3. The most preferred queue of thread 3 is assigned to queue 3.
4. The most preferred queue of thread 4 is assigned to queue 1.
5. The most preferred queue of thread 5 is assigned to queue 2.
6. The second most preferred queue of thread 1 is assigned to queue 3.
7. The second most preferred queue of thread 2 is assigned to queue 1.
8. The second most preferred queue of thread 3 is assigned to queue 2.
9. The second most preferred queue of thread 4 is assigned to queue 3.
10. The second most preferred queue of thread 5 is assigned to queue 1.
11. The third most preferred queue of thread 1 is assigned to queue 2.
12. The third most preferred queue of thread 2 is assigned to queue 3.
13. The third most preferred queue of thread 3 is assigned to queue 1.
14. The third most preferred queue of thread 4 is assigned to queue 2.
15. The third most preferred queue of thread 5 is assigned to queue 3.

One can see that the thread numbers are cyclically iterated from 1 to 5, and the queue numbers are cyclically iterated from 1 to 3, in the determination of the queue preference orders. Such iterative approach only works when neither the number of threads nor the number of queues is an integer multiple of the other.

Figure 11:
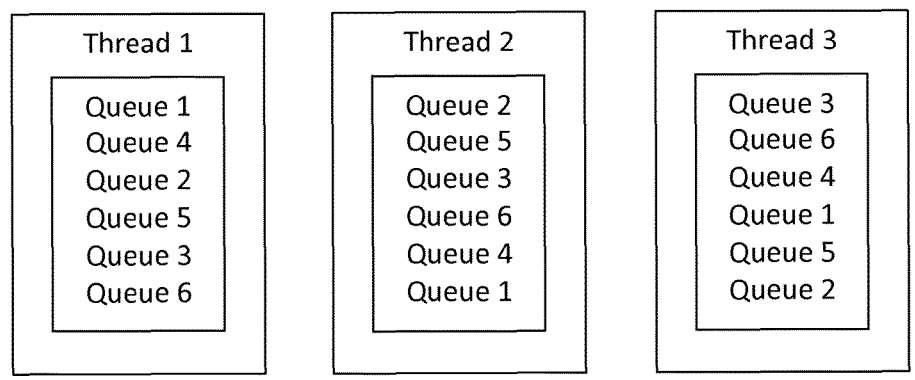
FIG. 11 depicts a plurality of threads, each of the threads being assigned a queue preference order, in accordance with one embodiment.

If the number of threads is an integer multiple of the number of queues (or the number of queues is an integer multiple of the number of threads), a modified approach may be used, such modified approach best understood by way of an example. FIG. 11 presents an example with three threads and six queues.

1. The most preferred queue of thread 1 is assigned to queue 1.
2. The most preferred queue of thread 2 is assigned to queue 2.
3. The most preferred queue of thread 3 is assigned to queue 3.
4. The second most preferred queue of thread 1 is assigned to queue 4.
5. The second most preferred queue of thread 2 is assigned to queue 5.
6. The second most preferred queue of thread 3 is assigned to queue 6.
7. The third most preferred queue of thread 1 is assigned to queue 2.
8. The third most preferred queue of thread 2 is assigned to queue 3.
9. The third most preferred queue of thread 3 is assigned to queue 4.
10. The fourth most preferred queue of thread 1 is assigned to queue 5.
11. The fourth most preferred queue of thread 2 is assigned to queue 6.
12. The fourth most preferred queue of thread 3 is assigned to queue 1.
13. The fifth most preferred queue of thread 1 is assigned to queue 3.
14. The fifth most preferred queue of thread 2 is assigned to queue 4.
15. The fifth most preferred queue of thread 3 is assigned to queue 5.
16. The sixth most preferred queue of thread 1 is assigned to queue 6.
17. The sixth most preferred queue of thread 2 is assigned to queue 1.
18. The sixth most preferred queue of thread 3 is assigned to queue 2.

The thread numbers are iterated cyclically from 1 to 3. The queue numbers are iterated cyclically from 1 to 6, but any time a thread is assigned a queue number for the second time (i.e., that it has previously already been assigned), that queue number is skipped and the next queue number is used (i.e., next number in the cyclic iteration). This scenario is illustrated, for example, in assigning the third most preferred queue of thread 1 to queue 2. Continuing with the cyclic iteration would have resulted in the third most preferred queue of thread 1 being assigned to queue 1. However, the most preferred queue of thread 1 was already assigned to queue 1. As a result, such assignment was omitted (or "skipped"), and the third most preferred queue of thread 1 was instead assigned to queue 2 (i.e., next number in the cyclic iteration).

Returning now to the example of FIG. 10, the execution of the five threads causes, during the first time period $T_1$, thread 1 to retrieve the request to take the snapshot of VM7 from queue 1 (i.e., its most preferred queue); thread 2 to retrieve the request to take the snapshot of VMD from queue 2 (i.e., its most preferred queue); thread 3 to retrieve the request to take the snapshot of VMK from queue 3 (i.e., its most preferred queue); thread 4 to retrieve the request to take the snapshot of VM5 from queue 1 (i.e., its most preferred queue); and thread 5 to retrieve the request to take the snapshot of VMC from queue 2 (i.e., its most preferred queue). The execution of the five threads causes, during the second time period $T_2$, thread 1 to retrieve the request to take the snapshot of VM3 from queue 1 (i.e., its most preferred queue); thread 2 to retrieve the request to take the snapshot of VMA from queue 2 (i.e., its most preferred queue); thread 3 to retrieve the request to take the snapshot of VMG from queue 3 (i.e., its most preferred queue); thread 4 to retrieve the request to take the snapshot of VM2 from queue 1 (i.e., its most preferred queue); and thread 5 to retrieve the request to take the snapshot of VM9 from queue 2 (i.e., its most preferred queue). The execution of the five threads causes, during the third time period $T_3$, thread 1 to retrieve the request to take the snapshot of VM1 from queue 1 (i.e., its most preferred queue).

It is noted that queue(s) with a higher number of requests (e.g., queue 1 and queue 2 in the example of FIG. 10) may be assigned as the most preferred queue in multiple threads. As a result of such assignment, queue(s) with a higher number of requests are likely to be simultaneously processed by a higher number of threads, as compared to queue(s) with a lower number of requests.

Figure 12:
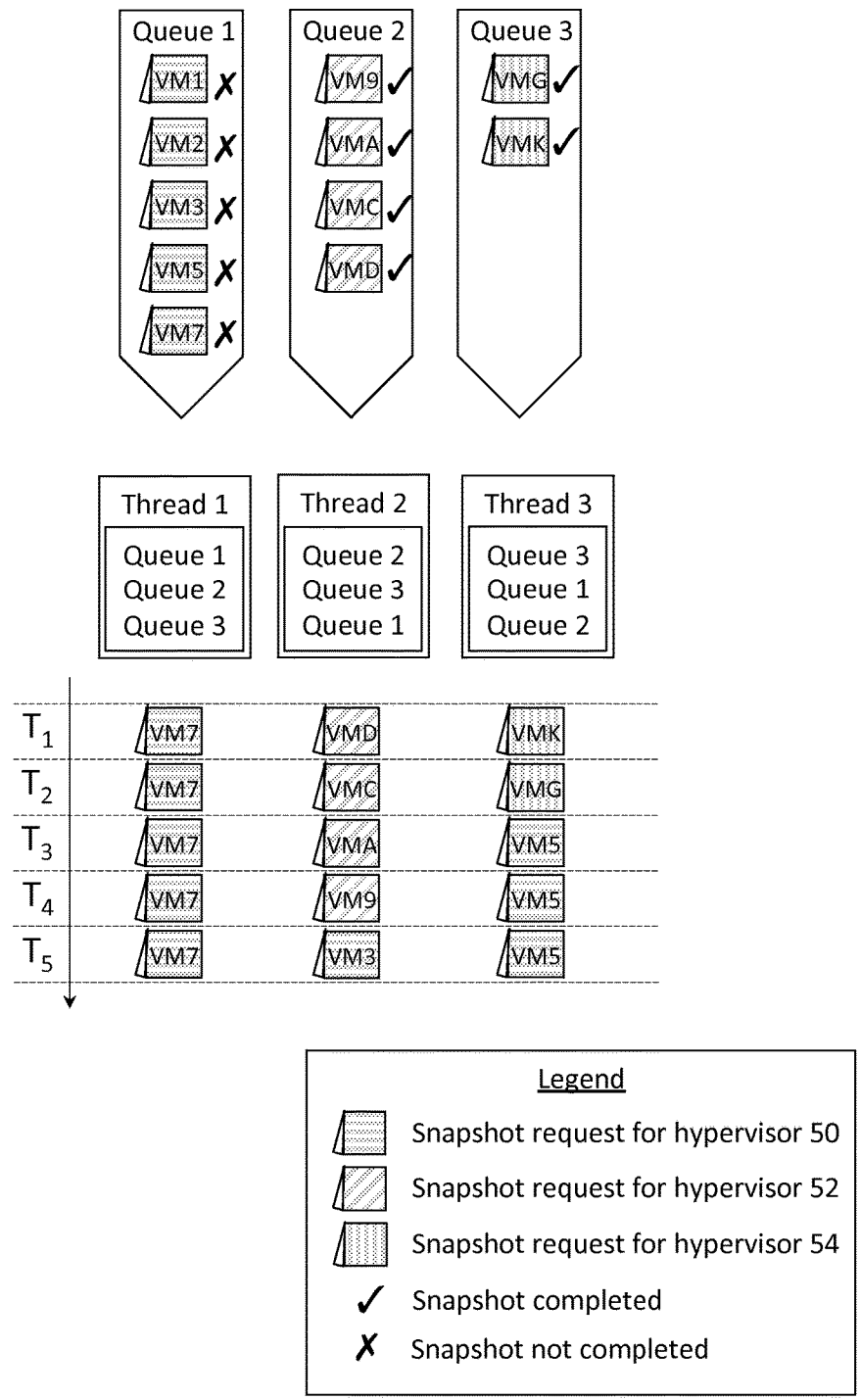
FIG. 12 depicts (i) a plurality of queues, each of the queues containing a plurality of snapshot requests to be handled by a respective one of the hypervisors, (ii) a plurality of threads, each of the threads associated with a queue preference order, and (iii) a sequence diagram displaying a plurality of time periods during which the execution of the threads causes the snapshot requests to be processed in parallel, the sequence diagram not exhibiting the phenomenon of "starvation" (described below), in accordance with one embodiment.
Figure 13A:
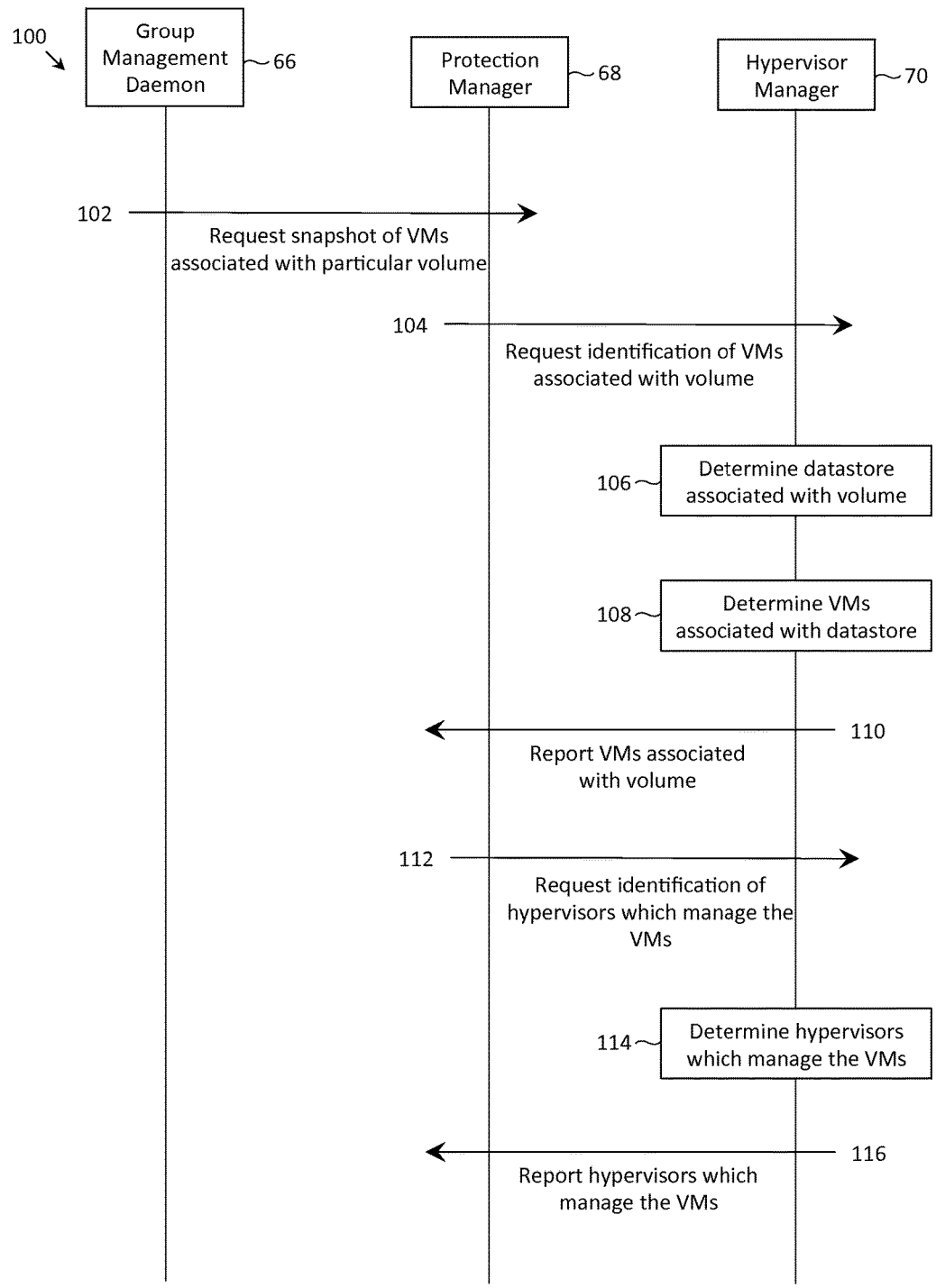
FIGS. 13A-13D depict a sequence diagram of the various interactions between a group management daemon, a protection manager and a hypervisor manager that may occur in the process of taking a volume snapshot, in accordance with one embodiment.
Figure 13B:
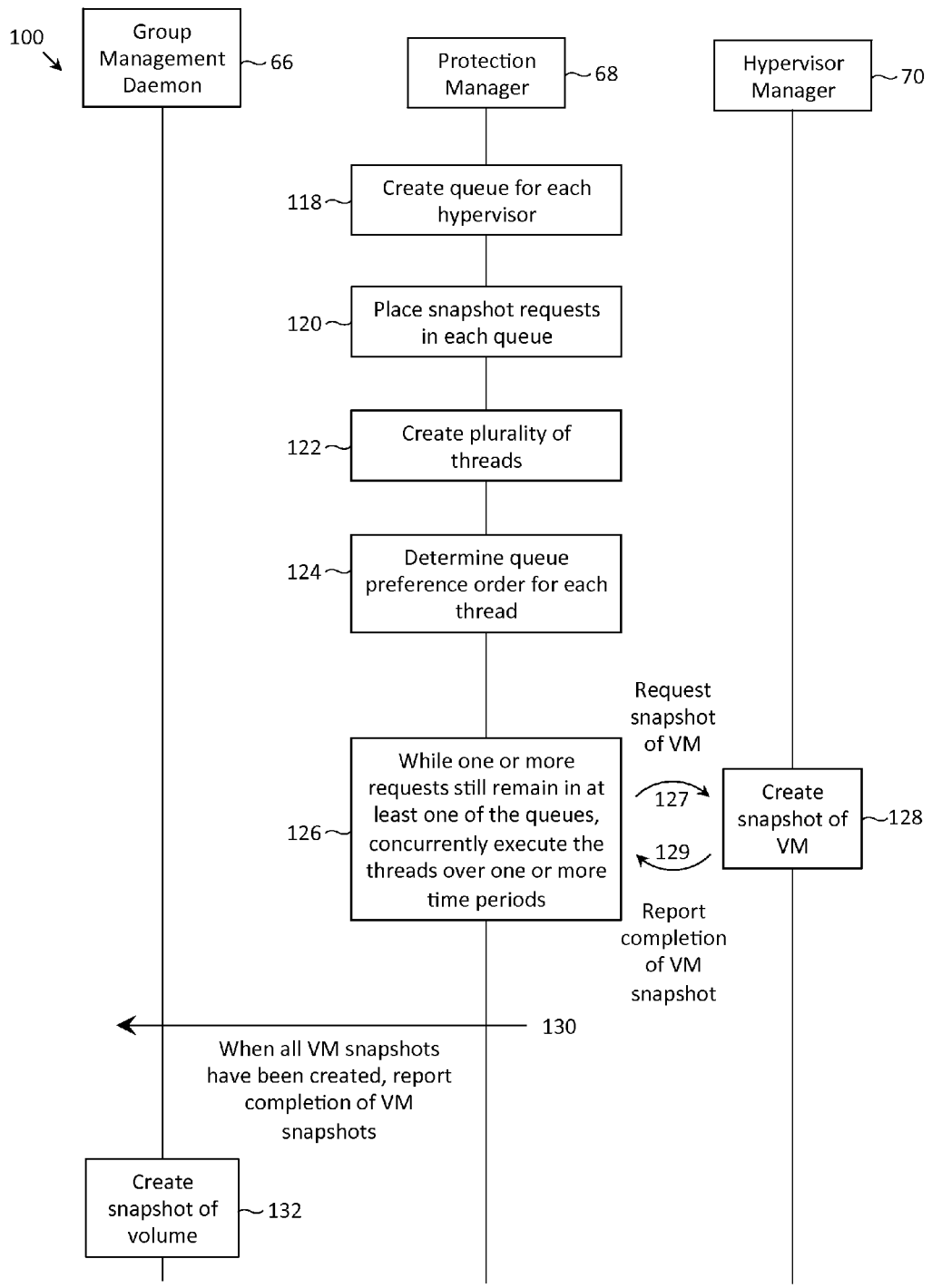
Figure 13C:
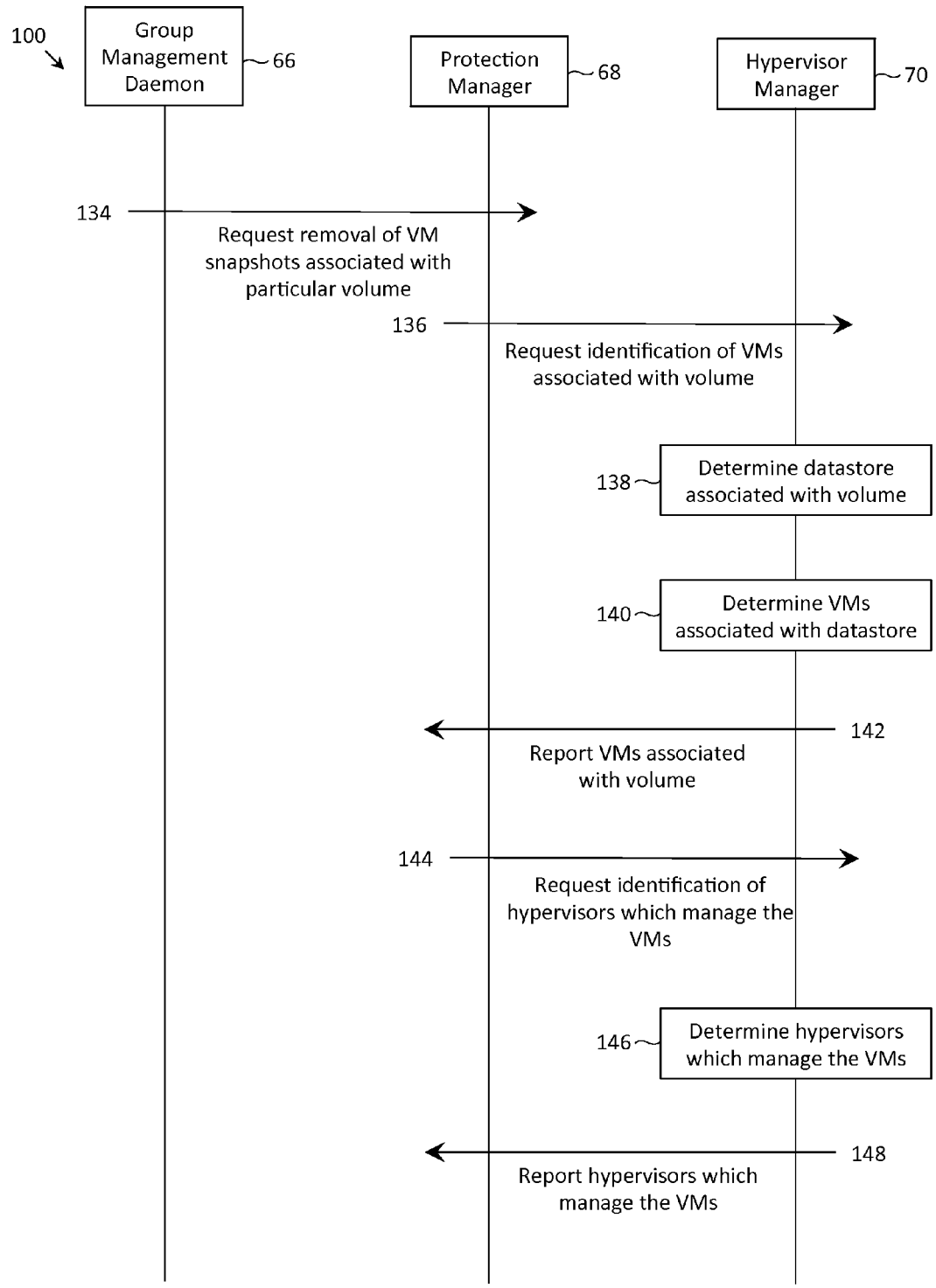
Figure 13D:
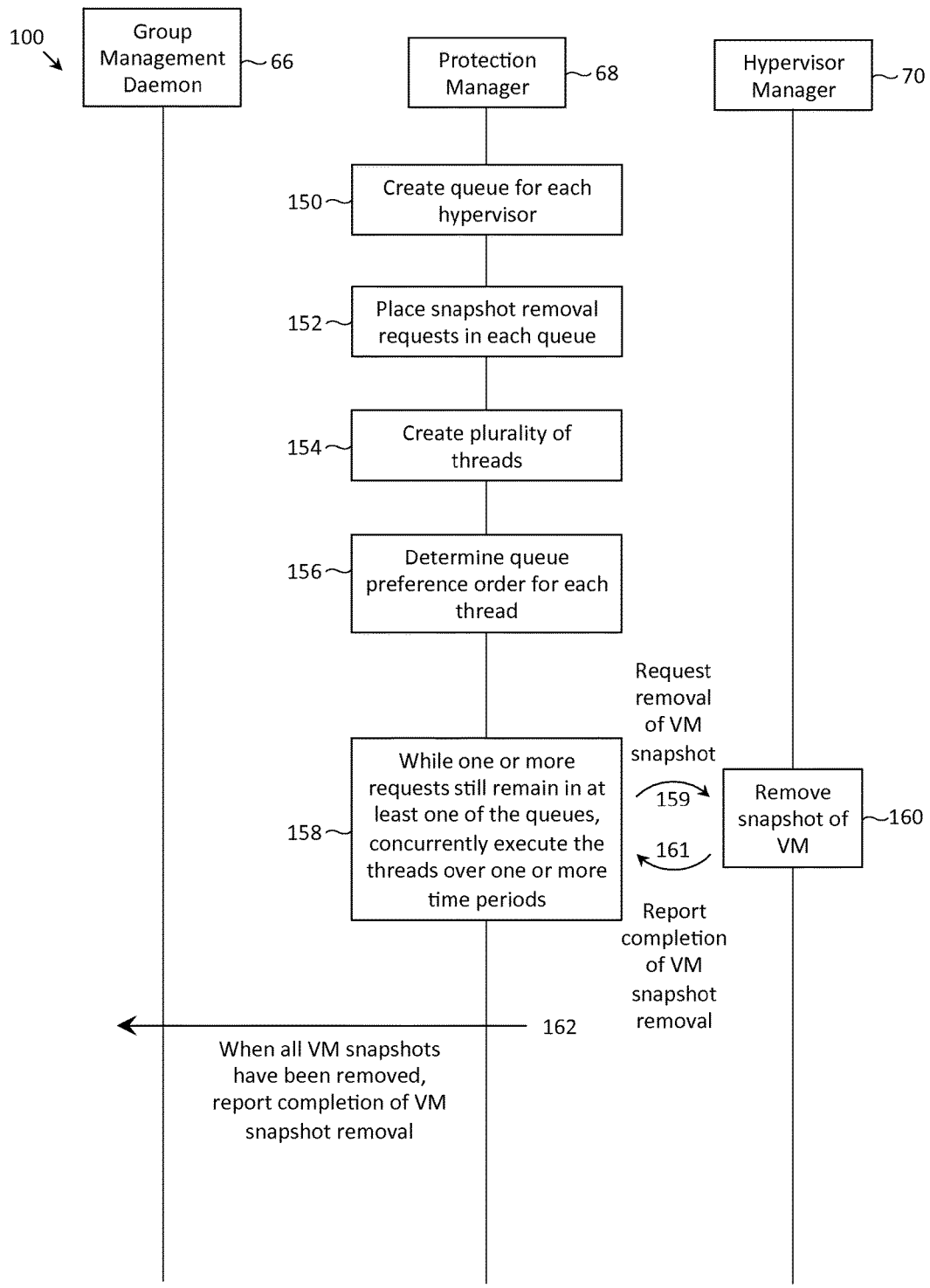

The example of FIG. 10 is presented a second time in FIG. 12, to illustrate how starvation is avoided, in accordance with techniques of one embodiment of the invention. In FIG. 12, hypervisor 50 receives snapshot requests, but is unable to complete the snapshot requests. As a result, execution of thread 1 causes the request to take a snapshot of VM7 to be retrieved in time period $T_1$, but the processing of such request by hypervisor 50 continues in the other time periods, preventing thread 1 from retrieving any further requests. Similarly, execution of thread 2 causes the request to take a snapshot of VM3 to be retrieved in time period $T_5$, but the processing of such request by hypervisor 50 continues in the subsequent time periods (not depicted), preventing thread 2 from retrieving any further requests. Similarly, execution of thread 3 causes the request to take a snapshot of VM5 to be retrieved in time period $T_3$, but the processing of such request by hypervisor 50 continues in the subsequent time periods, preventing thread 3 from retrieving any further requests. Despite all three threads being "held hostage" by hypervisor 50 (i.e., forced to serve only hypervisor 50), no starvation occurs due to the queue preference orders. Since queue 2 (associated with hypervisor 52) is the most preferred queue for thread 2, all snapshot requests are submitted and completed by hypervisor 52 before thread 2 is held hostage by hypervisor 50. Similarly, since queue 3 (associated with hypervisor 54) is the most preferred queue for thread 3, all snapshot requests are submitted and completed by hypervisor 54 before thread 3 is held hostage by hypervisor 50. Stated differently, poorly performing hypervisors (e.g., hypervisor 50) did not impede the progress of the operational hypervisors (i.e., hypervisors 52 and 54), which is the desired effect.

FIGS. 13A-13D depict sequence diagram 100 of the communication of various commands and data between group management daemon 66, protection manager 68 and hypervisor manager 70 to facilitate the snapshot of a volume and its associated virtual machines. Such sequence diagram is, of course, exemplary in nature and variations to the sequence diagram may be possible. While group management daemon 66 and protection manager 68 are depicted separately from one another, it is understood that the functionality of these modules could be integrated within a single module. At step 102, group management daemon 66 may request protection manager 68 to initiate a process to take virtual machine snapshots of one or more virtual machines (or all virtual machines) associated with a particular volume. In the example of FIG. 5C, the volume could be volume 62. The group management daemon's request may be in response to a periodically scheduled snapshot of a volume.

At step 104, protection manager 68 may request hypervisor manager 70 to identify the virtual machines that are associated with the volume (i.e., the volume specified in step 102). At step 106, hypervisor manager 70 may determine a datastore associated with the volume. In the example of FIG. 5C, hypervisor manager 70 may determine that datastore 64 is associated with volume 62. At step 108, hypervisor manager 70 may determine the virtual machines associated with the datastore. In the example of FIG. 5C, hypervisor manager 70 may determine that VM1, VM2, VM3, VMS, VM7, VM9, VMA, VMC, VMD, VMG and VMK are associated with datastore 64. At step 110, hypervisor manager 70 may report the virtual machines associated with the volume to protection manager 68.

At step 112, protection manager 68 may request hypervisor manager 70 to identify the hypervisors which manage the virtual machines associated with the volume. At step 114, hypervisor manager 70 may determine the hypervisor which manages each of the virtual machines associated with the volume. In the example of FIG. 5C, hypervisor manager 70 may determine that VM1, VM2, VM3, VM5 and VM7 are managed by hypervisor 50; VM9, VMA, VMC and VMD are managed by hypervisor 52; and VMG and VMK are managed by hypervisor 54. At step 116, hypervisor manager 70 may report the hypervisors which manage the virtual machines to protection manager 68.

At step 118, protection manager 68 may create a queue for each of the hypervisors. More specifically, protection manager 68 may create a plurality of queues on storage system 12, the plurality of queues having a one-to-one mapping to the plurality of hypervisors. In the example of FIG. 10, protection manager may create queue 1 (mapped to hypervisor 50), queue 2 (mapped to hypervisor 52) and queue 3 (mapped to hypervisor 54).

At step 120, protection manager 68 may place snapshot requests in each of the queues. More specifically, protection manager 68 may, for each of the virtual machines associated with volume 62, place a request to create a snapshot of the virtual machine in the queue mapped to the hypervisor which manages the virtual machine. In the example of FIG. 10, protection manager 68 may place requests to take snapshots of VM1, VM2, VM3, VM6 and VM7 in queue 1; may place requests to take snapshots of VM9, VMA, VMC and VMD in queue 2; and may place requests to take snapshots of VMG and VMK in queue 3.

At step 122, protection manager 68 may create a plurality of threads on storage system 12. As previously mentioned, the number of threads may be a user configurable number. Alternatively or in addition, the number of threads could be initiated with a default number (e.g., 3) and such default number could be overwritten by a user specified number. Alternatively or in addition, the number of threads could depend on a type of the hypervisor (whether type 1 or type 2), workloads for each of the virtual machines, etc. In the example of FIG. 10, protection manager 68 may create five threads.

At step 124, protection manager 68 may determine a queue preference order for each of the threads. Such determination was previously described in association with FIGS. 10 and 11. In the example of FIG. 10, thread 1 was assigned the queue preference order of queue 1 (i.e., queue 1 being the most preferred queue), queue 3 (i.e., queue 3 being the second most preferred queue) and queue 2 (i.e., queue 2 being the least preferred queue).

At step 126, protection manager 68 (or more precisely processor 22 of storage controller 20 of storage system 12) may, while one or more requests still remain in at least one of the queues, concurrently execute one or more of the threads over one or more time periods. During each of the one or more time periods, the execution of the one or more threads may cause processor 22 to perform the following for each of the one or more threads: (i) select one of the queues from those queues that still have at least one request, the selection being based on the queue preference order assigned to the thread; (ii) retrieve one of the snapshot requests from the selected queue; and (iii) process the retrieved snapshot request.

As described above, the processing of a request to take a snapshot of a subject virtual machine more particularly may involve protection manager 68 sending a request (step 127) to hypervisor manager 70 to take a snapshot of the subject virtual machine. At step 128, hypervisor manager 70 may create a snapshot of the subject virtual machine. In creating the snapshot, hypervisor manager 70 may actually instruct the hypervisor which manages the subject virtual machine to create the snapshot. Upon completion of the snapshot, hypervisor manager 70 may report the completion of the snapshot to protection manager 68 (step 129).

At step 130, protection manager 68 may report the completion of all the snapshots of the virtual machines associated with the volume to the group management daemon 66. At step 132, group management daemon 66 may take a snapshot of the volume. In the example of FIG. 5C, group management daemon 66 may take a snapshot of volume 62.

At step 134 (after completion of the volume snapshot), group management daemon 66 may request protection manager 68 to initiate a process to remove virtual machine snapshots of one or more virtual machines (or all virtual machines) associated with a particular volume. In the example of FIG. 5C, the volume could be volume 62.

At step 136, protection manager 68 may request hypervisor manager 70 to identify the virtual machines associated with the volume (i.e., the volume specified in step 134). At step 138, hypervisor manager 70 may determine a datastore associated with the volume. In the example of FIG. 5C, hypervisor manager 70 may determine that datastore 64 is associated with volume 62. At step 140, hypervisor manager 70 may determine the virtual machines associated with the datastore. In the example of FIG. 5C, hypervisor manager 70 may determine that VM1, VM2, VM3, VM5, VM7, VM9, VMA, VMC, VMD, VMG and VMK are associated with datastore 64. At step 142, hypervisor manager 70 may report the virtual machines associated with the volume to protection manager 68.

At step 144, protection manager 68 may request hypervisor manager 70 to identify the hypervisors which manage the virtual machines associated with the volume. At step 146, hypervisor manager 70 may determine the hypervisor which manages each of the virtual machines associated with the volume. In the example of FIG. 5C, hypervisor manager 70 may determine that VM1, VM2, VM3, VM5 and VM7 are managed by hypervisor 50; VM9, VMA, VMC and VMD are managed by hypervisor 52; and VMG and VMK are managed by hypervisor 54. At step 148, hypervisor manager 70 may report the hypervisors which manage the virtual machines to protection manager 68. It is noted that steps 136, 138, 140, 142, 144, 146 and 148 need not be performed if protection manager 68 maintains a record of the virtual machines associated with each volume and a record of the hypervisors which manage each of the virtual machines (e.g., such record recording the information previously received during steps 110 and 116).

At step 150, protection manager 68 may create a queue for each of the hypervisors. More specifically, protection manager 68 may create a plurality of queues on storage system 12, the plurality of queues having a one-to-one mapping to the plurality of hypervisors. In the example of FIG. 10, protection manager may create queue 1 (mapped to hypervisor 50), queue 2 (mapped to hypervisor 52) and queue 3 (mapped to hypervisor 54). It is noted that step 150 need not be performed if the queues created in step 118 are maintained.

At step 152, protection manager 68 may place snapshot removal requests in each of the queues. More specifically, protection manager 68 may, for each of the virtual machines associated with volume 62, place a request to remove a snapshot of the virtual machine in the queue mapped to the hypervisor which manages the virtual machine. In the example of FIG. 10, protection manager 68 may place requests to remove snapshots of VM1, VM2, VM3, VM5 and VM7 in queue 1; may place requests to remove snapshots of VM9, VMA, VMC and VMD in queue 2; and may place requests to remove snapshots of VMG and VMK in queue 3. While FIG. 10 has been depicted for the creation of snapshots, one can readily adapt the figure for the removal of snapshots.

At step 154, protection manager 68 may create a plurality of threads on storage system 12. It is noted that step 154 need not be performed if the threads created in step 122 are maintained.

At step 156, protection manager 68 may determine a queue preference order for each of the threads. Such determination was previously described in association with FIGS. 10 and 11. It is noted that step 156 need not be performed if the queue preference orders from step 124 are maintained.

At step 158, protection manager 68 (or more precisely processor 22 of storage controller 20 of storage system 12) may, while one or more requests still remain in at least one of the queues, concurrently execute one or more of the threads over one or more time periods. During each of the one or more time periods, the execution of the one or more threads may cause processor 22 to perform the following for each of the one or more threads: (i) select one of the queues from those queues that still have at least one request, the selection being based on the queue preference order assigned to the thread; (ii) retrieve one of the snapshot removal requests from the selected queue; and (iii) process the retrieved snapshot removal request.

The processing of a request to remove a snapshot of a subject virtual machine more particularly may involve protection manager 68 sending a request to hypervisor manager 70 to remove a snapshot of the subject virtual machine (step 159). At step 160, hypervisor manager 70 may remove a snapshot of the subject virtual machine. In removing the snapshot, hypervisor manager 70 may actually instruct the hypervisor which manages the subject virtual machine to remove the snapshot. Upon completion of the snapshot removal, hypervisor manager 70 may report the completion of the snapshot removal to protection manager 68 (step 161).

At step 162, protection manager 68 may report, to group management daemon 66, that all the snapshots of the virtual machines associated with the volume have been removed.

Figure 14:
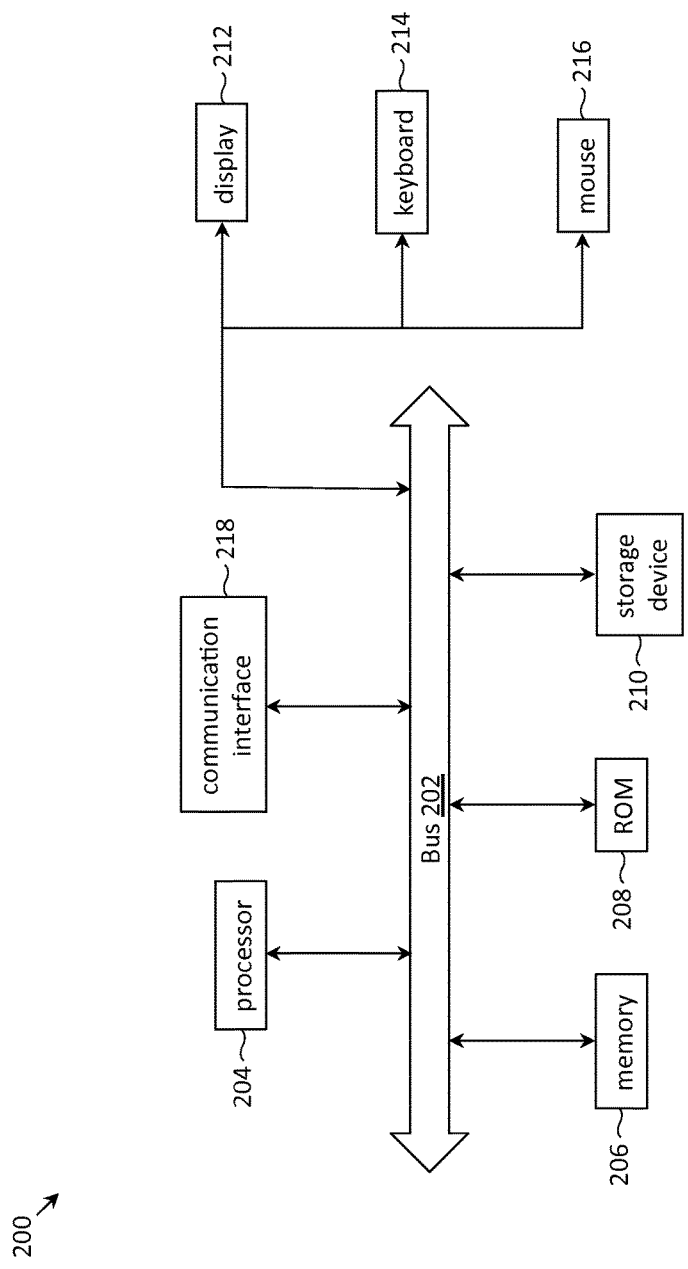
FIG. 14 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 14 provides an example of a system 200 that is representative of any of the computing systems discussed herein. Further, computer system 200 may be representative of one or more of group management daemon 66, protection manager 68 and hypervisor manager 70, and may be representative of one or more components that perform the processes depicted in FIGS. 13A-13D. Note, not all of the various computer systems have all of the features of system 200. For example, certain ones of the computer systems discussed above may not include a display inasmuch as the display function may be provided by a client computer communicatively coupled to the computer system or a display function may be unnecessary. Such details are not critical to the present invention.

System 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods and systems for concurrently taking snapshots of a plurality of virtual machines have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for creating snapshots of a plurality of virtual machines instantiated on one or more hosts, each of the virtual machines (i) managed by one of a plurality of hypervisors instantiated on the one or more hosts, and (ii) storing data on a storage system communicatively coupled to the one or more hosts, the method comprising:
   creating, by a storage controller of the storage system, a plurality of queues having a one-to-one mapping to the plurality of hypervisors;
   placing by the storage controller a request to create a snapshot of one of the virtual machines in the queue mapped to the hypervisor which manages the virtual machine; and
   concurrently executing by the storage controller one or more software threads, wherein the execution of the one or more software threads causes the storage controller to perform the following for each of the one or more software threads:
   (i) select one of the queues based on a queue preference order assigned to the software thread;
   (ii) retrieve one of the snapshot requests from the selected queue; and
   (iii) process the retrieved snapshot request,
   wherein at a first time instance, a first one of the one or more software threads is assigned to a first one of the queues, and at a second time instance, the first software thread is assigned to a second one of the queues based on the queue preference order assigned to the first software thread.

2. The method of claim 1, wherein for each of the software threads, the queue preference order orders the plurality of queues from a most preferred queue to a least preferred queue.

3. The method of claim 2, wherein a first one of the queues contains the most number of requests, and the first queue is the most preferred queue of at least two of the software threads.

4. The method of claim 1, wherein the queue preference order for a first one of the threads is different from the queue preference order for a second one of the threads.

5. The method of claim 1, wherein, as a result of the processing of the one or more snapshot requests, a snapshot of one or more of the virtual machines is created so as to capture a state of one or more of the virtual machines.

6. The method of claim 5, further comprising, after snapshots have been created for all of the virtual machines, creating by the storage system a snapshot of a storage volume of the storage system so as to maintain a state of the storage volume, wherein the storage volume comprises the state of each one of the virtual machines.

7. The method of claim 6, further comprising, after creating the storage volume snapshot, requesting one or more of the virtual machine snapshots to be removed.

8. A storage system, comprising:
a storage volume storing data from a plurality of virtual machines which are instantiated on one or more hosts communicatively coupled to the storage system, each of the virtual machines being managed by one of a plurality of hypervisors instantiated on the one or more hosts;
a main memory;
a processor communicatively coupled to the storage volume and the main memory; and
software instructions on the main memory that, when executed by the processor, cause the processor to:
create a plurality of queues having a one-to-one mapping to the plurality of hypervisors;
place a request to create a snapshot of one of the virtual machines in the queue mapped to the hypervisor which manages the virtual machine; and
concurrently execute one or more software threads, wherein the execution of the one or more software threads causes the processor to perform the following for each of the one or more software threads:
(i) select one of the queues based on a queue preference order assigned to the software thread;
(ii) retrieve one of the snapshot requests from the selected queue; and
(iii) process the retrieved snapshot request,
wherein at a first time instance, a first one of the one or more software threads is assigned to a first one of the queues, and at a second time instance, the first software thread is assigned to a second one of the queues based on the queue preference order assigned to the first software thread.

9. The storage system of claim 8, wherein for each of the software threads, the queue preference order orders the plurality of queues from a most preferred queue to a least preferred queue.

10. The storage system of claim 9, wherein a first one of the queues contains the most number of requests, and the first queue is the most preferred queue of at least two of the software threads.

11. The storage system of claim 8, wherein the queue preference order for a first one of the threads is different from the queue preference order for a second one of the threads.

12. The storage system of claim 8, wherein, as a result of the processing of the one or more snapshot requests, a snapshot of one or more of the virtual machines is created so as to capture a state of one or more of the virtual machines.

13. The storage system of claim 12, further comprising software instructions on the main memory that, when executed by the processor, cause the processor to, after snapshots have been created for all of the virtual machines, create a snapshot of the storage volume so as to maintain a state of the storage volume, wherein the storage volume comprises the state of each one of the virtual machines.

14. The storage system of claim 13, further comprising software instructions on the main memory that, when executed by the processor, cause the processor to, after creating the storage volume snapshot, request one or more of the virtual machine snapshots to be removed.

15. A non-transitory machine-readable storage medium for a storage system having (i) a storage volume storing data from a plurality of virtual machines which are instantiated on one or more hosts communicatively coupled to the storage system, each of the virtual machines being managed by one of a plurality of hypervisors instantiated on the one or more hosts, (ii) a main memory, and (iii) a processor communicatively coupled to the storage volume and the main memory, the non-transitory machine-readable storage medium comprising software instructions that, when executed by the processor, cause the processor to:
create a plurality of queues having a one-to-one mapping to the plurality of hypervisors;
place a request to create a snapshot of one of the virtual machines in the queue mapped to the hypervisor which manages the virtual machine; and
concurrently execute one or more software threads, wherein the execution of the one or more software threads causes the processor to perform the following for each of the one or more software threads:
(i) select one of the queues based on a queue preference order assigned to the software thread;
(ii) retrieve one of the snapshot requests from the selected queue; and
(iii) process the retrieved snapshot request,
wherein at a first time instance, a first one of the one or more software threads is assigned to a first one of the queues, and at a second time instance, the first software thread is assigned to a second one of the queues based on the queue preference order assigned to the first software thread.

16. The non-transitory machine-readable storage medium of claim 15, wherein for each of the software threads, the queue preference order orders the plurality of queues from a most preferred queue to a least preferred queue.

17. The non-transitory machine-readable storage medium of claim 16, wherein a first one of the queues contains the most number of requests, and the first queue is the most preferred queue of at least two of the software threads.

18. The non-transitory machine-readable storage medium of claim 15, wherein, as a result of the processing of the one or more snapshot requests, a snapshot of one or more of the virtual machines is created so as to capture a state of one or more of the virtual machines.

19. The non-transitory machine-readable storage medium of claim 15, further comprising software instructions that, when executed by the processor, cause the processor to, after snapshots have been created for all of the virtual machines, create a snapshot of the storage volume so as to maintain a state of the storage volume, wherein the storage volume comprises the state of each one of the virtual machines.

20. The non-transitory machine-readable storage medium of claim 15, further comprising software instructions that, when executed by the processor, cause the processor to, after creating the storage volume snapshot, request one or more of the virtual machine snapshots to be removed.

* * * * *